US007506307B2

(12) United States Patent
McCollum et al.

(10) Patent No.: US 7,506,307 B2
(45) Date of Patent: Mar. 17, 2009

(54) RULES DEFINITION LANGUAGE

(75) Inventors: Raymond W. McCollum, Redmond, WA (US); Radu R. Palanca, Seattle, WA (US); Steven J. Menzies, Sammamish, WA (US); Douglas R. Beck, Seattle, WA (US); Marc D. Reyhner, Redmond, WA (US); Lorenzo Rizzi, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 10/692,660

(22) Filed: Oct. 24, 2003

(65) Prior Publication Data

US 2005/0091640 A1    Apr. 28, 2005

(51) Int. Cl.
*G06F 9/44* (2006.01)
(52) U.S. Cl. .................. 717/117; 717/119; 717/149; 717/153; 717/159
(58) Field of Classification Search .................. 717/117, 717/119, 149, 153, 159
See application file for complete search history.

(56) References Cited

U.S. PATENT DOCUMENTS

| 5,732,234 | A | 3/1998 | Vassiliadis et al. |
|---|---|---|---|
| 5,920,873 | A | 7/1999 | Van Huben et al. |
| 6,012,152 | A | 1/2000 | Douik et al. |
| 6,067,548 | A | 5/2000 | Cheng |
| 6,085,030 | A | 7/2000 | Whitehead et al. |
| 6,138,168 | A | 10/2000 | Kelly et al. |
| 6,212,581 | B1 * | 4/2001 | Graf .......................... 710/18 |
| 6,219,666 | B1 | 4/2001 | Krishnaswamy et al. |
| 6,477,572 | B1 | 11/2002 | Elderton et al. |
| 6,553,387 | B1 | 4/2003 | Cabrera et al. |
| 6,598,060 | B2 | 7/2003 | Goldick |
| 6,684,231 | B1 | 1/2004 | Cabrera et al. |
| 2002/0019870 | A1 | 2/2002 | Chirashnya et al. |
| 2002/0049715 | A1 | 4/2002 | Sorrano-Morales et al. |
| 2002/0059425 | A1 | 5/2002 | Belfiore et al. |
| 2002/0133535 | A1 | 9/2002 | Lucovsky et al. |
| 2002/0147726 | A1 | 10/2002 | Yehia et al. |
| 2002/0174125 | A1 | 11/2002 | Lucovsky et al. |
| 2003/0135628 | A1 | 7/2003 | Fletcher et al. |
| 2003/0177109 | A1 | 9/2003 | Cabrera et al. |
| 2004/0031038 | A1 | 2/2004 | Hugly et al. |
| 2004/0083454 | A1 * | 4/2004 | Bigus et al. ............ 717/117 |
| 2004/0111638 | A1 | 6/2004 | Yadav et al. |
| 2004/0181541 | A1 | 9/2004 | Groenendaal et al. |
| 2005/0097146 | A1 | 5/2005 | Konstantinou et al. |

(Continued)

OTHER PUBLICATIONS

International Search Report dated Oct. 14, 2005 mailed Dec. 2, 2005 for PCT Application Serial No. PCT/US04/22378, 6 pages.

(Continued)

*Primary Examiner*—Tuan Q Dam
*Assistant Examiner*—Zheng Wei
(74) *Attorney, Agent, or Firm*—Amin, Turocy & Calvin, LLP

(57) ABSTRACT

A rules definition language the authoring rules for concurrent processing. The RDL includes statements that facilitate efficient use of computer resources by allowing a rule to be broken down into one or more instructions, and processing these instructions asynchronously to provide more efficient use of the computer resources. Once processed into the instructions, results thereof can be passed among the instructions to facilitate process completion of the rule.

27 Claims, 14 Drawing Sheets

U.S. PATENT DOCUMENTS

2005/0172306 A1    8/2005    Agarwal et al.

OTHER PUBLICATIONS

T. Berners-Lee et al., Uniform Resource Identifiers (URI): Generic Syntax, Network Working Group, Aug. 1998, pp. 1-38.

Along Lin, A New Model-Based Automated Diagnosis Algorithm, Feb. 1998, pp. 1-6.

B. Ranvindran, Engineering Dynamic Real-Time Distributed Systems: Architecture, System Description Language, and Middleware, IEEE Transactions on Software Engineering, Jan. 2002, pp. 30-57, vol. 28, No. 1.

T. Roscoe et al., InfoSpect: Using A Logic Language for System Health Monitoring in Distributed Systems, Proceedings of the SIGOPS European Workshop, Sep. 2002, pp. 1-7, Saint-Emilion, France.

F. Steimann et al., Models Based Diagnosis for Open Systems Fault Management, AI Communications, 1999, 12 pages.

V. Sugumaran et al., A Semantic-Based Approach to Component Retrieval, The Data Base for Advances in Information Systems, pp. 8-24, Summer 2003, vol. 34, No. 3.

F. Manola et al., RDF Primer W3C Working Draft Oct. 10, 2003, W3C, pp. 1-119.

J. Kunze, Functional Recommendations for Internet Resource Locators, http://www.ietf.org/rfc/rfc1736.txt, Feb. 1995, 10 pages.

K. Sollins, Functional Requirements for Uniform Resource Names, http://www.ietf.org/rfc/rfc1736.txt, Dec. 1994, 7 pages.

International Search Report, PCT/US04/22275, Dated Mar. 4, 2005.

Hewlett-Packard, Event Correlation Services Designer Overview & Features, http://www.openview.hp.com/products/ovocd/index.html, 1994-2003.

Hewlettt-Packard, Event Correlation Services Designer's Guide, HP OpenView, pp. 1-236, Sep. 1998.

IBM Corporation, Rule Builder's Guide, Version 3.8, pp. 1-450, 2002.

Computer Associates International, Inc., Using the Performance Neugent Guide, 1999-2000.

Computer Associates International, Inc., Working with Neugents Guide, 1999.

* cited by examiner

RULES DEFINITION LANGUAGE

CROSS-REFERENCE TO RELATED APPLICATIONS

This application is related to the following co-pending U.S. patent applications: Ser. No. 10/692,216 entitled "MODEL-BASED MANAGEMENT OF COMPUTER SYSTEMS AND DISTRIBUTED APPLICATIONS" filed on Oct. 23, 2003; Ser. No. 10/693,072 entitled "SCALABLE SYNCHRONOUS AND ASYNCHRONOUS PROCESSING OF MONITORING RULES" filed on Oct. 24, 2003; Ser. No. 10/693,588 entitled "USING URI'S TO IDENTIFY MULTIPLE INSTANCES WITH A COMMON SCHEMA" filed on Oct. 24, 2003; and, Ser. No. 10/692,432 entitled "USE OF ATTRIBUTION TO DESCRIBE MANAGEMENT INFORMATION" filed on Oct. 23, 2003.

TECHNICAL FIELD

This invention is related to software for processing rules.

BACKGROUND OF THE INVENTION

The most fundamental primitive is the rule, which implements the logic to continuously evaluate conditions and initiate actions. For example, a rule may watch the state of a system disk and report an error when the disk usage goes below a certain threshold. Another rule may monitor the CPU utilization and report an error when the utilization crosses a certain threshold. In a typical monitoring system, both rules would run simultaneously. In traditional rule-based systems, rule statements are interpreted or compiled into a machine code sequence and the system makes calls to a runtime library on a piecemeal basis as the statements are executing synchronously. More specifically, if the rule requires that a value be compared against a limit, the rules engine will tend to use computer resources to evaluate the whole rule statement. Moreover, where a plurality of rules are involved, which is the typical scenario, traditional systems execute the rules sequentially, placing an enormous burden on system resources where thousands of rules needs to be processed.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a rules definition language (RDL) that includes statements that facilitate efficient use of computer resources by allowing a rule to be broken down into one or more instructions, and processing these instructions asynchronously to provide more efficient use of the computer resources. Further, execution flow is carefully studied and planned to prevent infinite looping. Once processed into the instructions, results thereof can be passed among the instructions to facilitate process completion of the rule.

Once the rule has been decomposed into smaller instructions, each of these is independently scheduled for execution. Instructions which need output of previous instructions are segregated, and messages are generated to deliver the inputs to these dependent instructions. They in turn generate output messages for their own dependents, and so on, until the logic has completed. The net result is that the natural model for defining continuous operations, the "infinite loop" is encouraged and supported by the system.

The RDL is designed to enable the definition of rules for the purposes of monitoring the availability of software and hardware components. A function of the language is to test assertions, enforce constraints using runtime information, make inferences, perform correlation and communicate the results of dynamic tests to other components. Rules written in RDL are executed by the system, and is the basis of intelligent response and corrective actions in the a computer monitoring service. RDL facilitates automated rule instantiation based on XML, built-in polling without threading or concurrency considerations, and automated logging of rule instance information in alerts.

The RDL improves system performance by making it easy to trigger rule evaluation based on the occurrence of an event with an OnEvent attribute. Similarly, an OnPoll attribute allows for the execution of a rule on a recurrent schedule, which is useful to retrieve performance counter samples, data from probes, or to invoke some application program interface (API) and reason over the collected data to determine the best course of action.

The RDL includes statements that provide the capability to separate rule logic data from rule configuration data through parameterization. This is a process similar to the instantiation of classes via constructors. The RDL code defines the rule type (class) while a separate document is used to create instances of the rule type by specifying the parameter values necessary for its instantiation.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
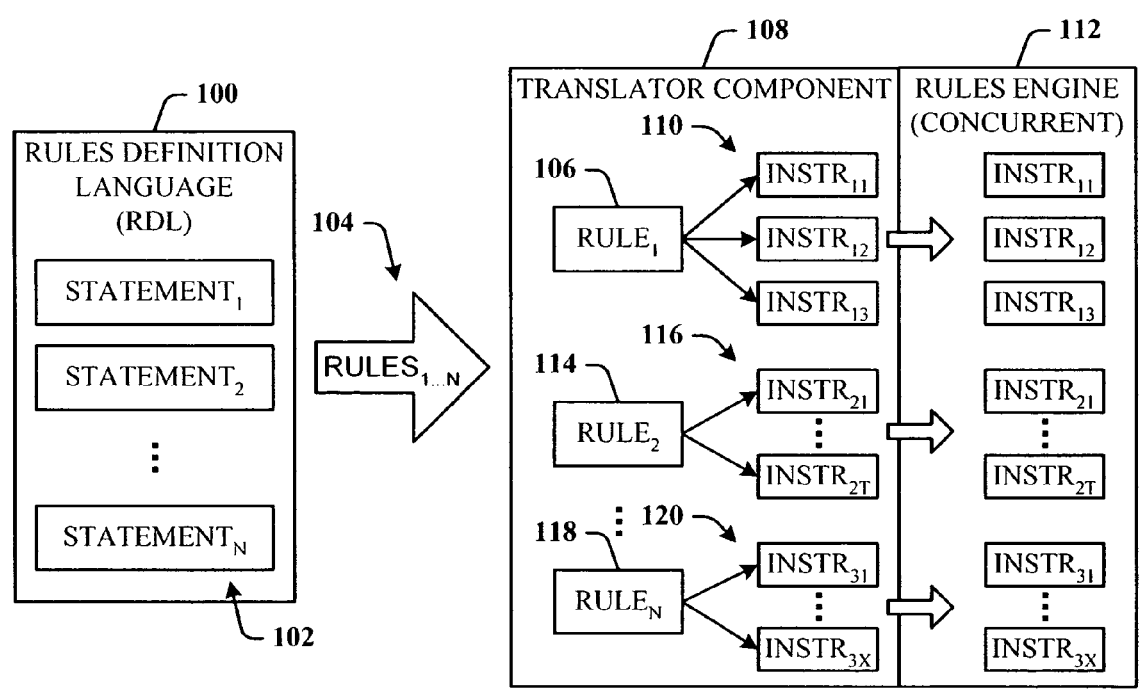
FIG. 1 illustrates a block diagram that represents a rules definition language (RDL) of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a block diagram that represents a rules definition language (RDL) 100 of the present invention. The purpose of the RDL 100 is to test assertions, enforce constraints using runtime information, make inferences, perform correlation, and communicate results of dynamic test to other component. In support thereof, the RDL 100 includes a number of statements 102 (also denoted STATEMENT$_1$, STATEMENT$_2$, ..., STATEMENT$_N$) that facilitate structuring one or more rules 104 for concurrent processing. The statements 102 are described in detail hereinbelow.

A first rule 106 (denoted RULE$_1$) authored in the RDL 100 is passed into a translator component 108 that decomposes the first rule 106 in accordance with the RDL statements 102 into a plurality of instructions 110 (here, three instructions denoted as INSTR$_{11}$, INSTR$_{12}$, and INSTR$_{13}$). The RDL 100 provides the capability such that the instructions 110 are decomposed into a format that facilitates asynchronous processing thereof. Thus, the RDL 100 provides a programming mechanism that facilitates more efficient asynchronous processing by the rules engine 106 such that system resources are not overly burdened, as can occur in traditional systems that inefficiently capture system resources for processing rules sequentially. Once decomposed, the instructions 110 are then passed into a rules engine for 112 for concurrent processing.

Of course, there are many rules 104 (denoted RULES$_{1...N}$) that can be authored in the RDL 100 and, accommodated for translation and parallel processing. Thus, there is a second rule 114 (denoted RULE$_2$) that is reduced to T instructions 116 (also denoted INSTR$_{21}$ ... INSTR$_{2T}$), and an Nth rule 118 (denoted RULE$_N$) that is reduced to X instructions 120 (also denoted INSTR$_{N1}$ ... INSTR$_{NX}$).

The rules engine 112 processes the instructions (110, 116, and 120) concurrently such that results from any first instruction can be passed to one or more second instructions that require the result. As results are further used to complete processing of subsequent instructions (110, 116, and 120), processing of the corresponding rule (106, 114, and/or 118) completes.

Figure 2:
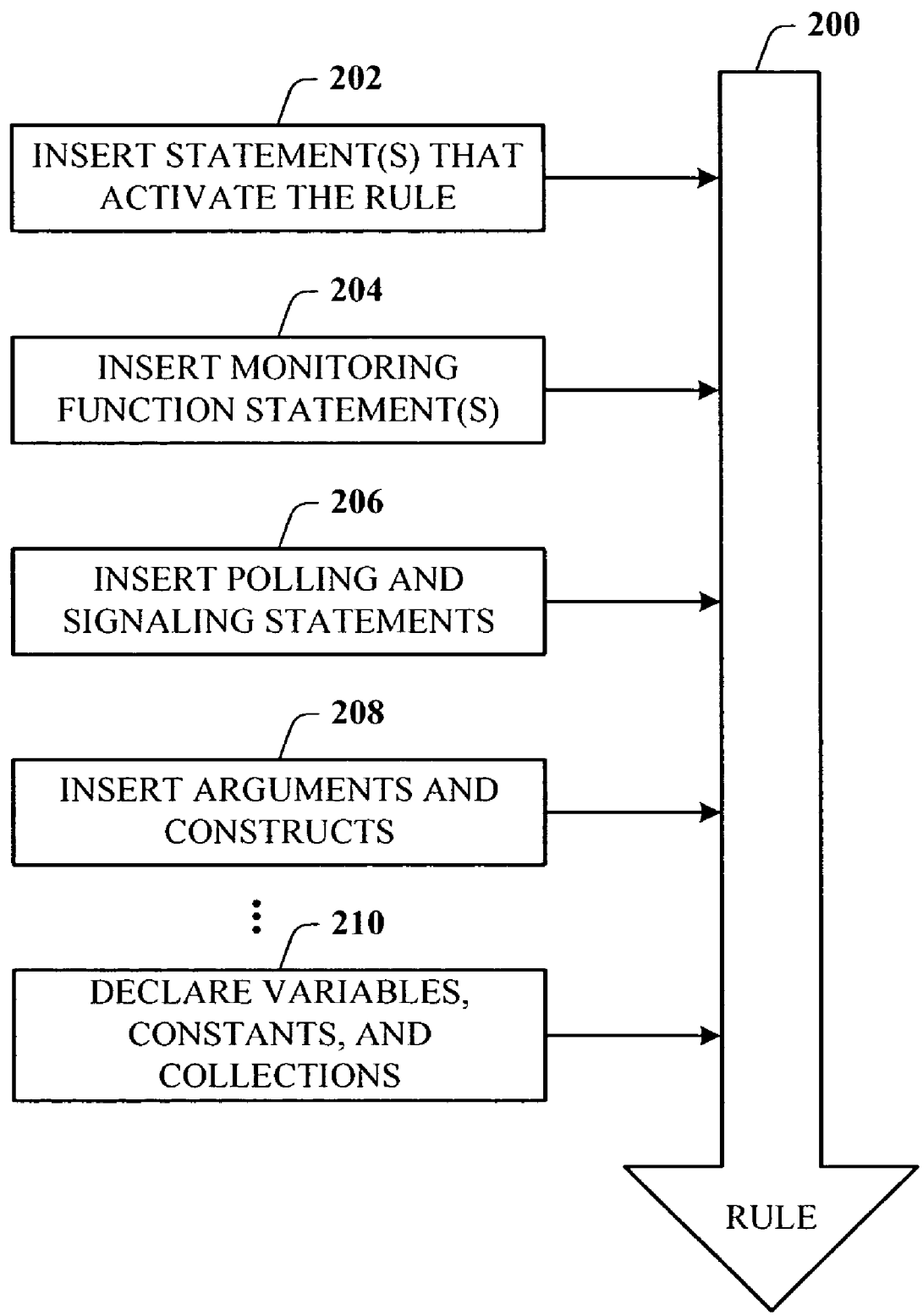
FIG. 2 illustrates a flow process for authoring a rule accordance with rule statements of the present invention.

Referring now to FIG. 2, there is illustrated a flow process for authoring a rule accordance with rule statements of the present invention. While, for purposes of simplicity of explanation, the one or more methodologies shown herein, e.g., in the form of a flow chart or process, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The RDL can be used to facilitate many system health monitoring functions and operations through the use of authored rules 200. In support thereof, the RDL includes one or more statements 202 that activate the rule 200, monitoring function statements 204, polling and signal statements 206, arguments and constructs 208, and variables, constants and collections 210. Of course, there are more statements, the description of which are included hereinbelow.

Following is a brief description of some RDL statements, with a more detailed description of the RDL statements hereinbelow.

The Startup Attribute

The Startup attribute is used to indicate that a rule is activated immediately after being loaded in the monitoring service. The Startup attribute can be used in conjunction with the OnPoll and OnEvent attributes.

```
<Startup>
Rule MyRule( )
    'my code...
End Rule
```

The OnPoll Attribute

The OnPoll attribute is used to configure a continuous polling loop or indicate that a rule is activated on a regular interval. Unless it is coupled with the Startup attribute, the polling of the rule is not active until activated by another rule.

```
<Startup, OnPoll(5L)>_
Rule MyRule( )
    ...rule body
End Rule
```

The OnPoll keyword causes the loop to execute, and then wait for the polling interval to expire before it repeats again. OnPoll is not equivalent to Sleep, in that it takes into account the amount of time elapsed to execute the body of the loop. For example, if a polling loop is sixty seconds and the body of the loop requires fifty seconds, then the OnPoll will only block for the remaining ten seconds. If the rule requires longer than the poling interval to execute, then a polling interval will be missed. The rule only executes on cycles which begin at starttime modulo interval. This attribute does not run automatically cause the rule to run at startup. The <Startup> attribute is required for this. The first execution cycle starts immediately (within thread scheduling limits) and does not wait for the polling interval to expire. To start a rule with the <OnPoll> attribute, independently from some other rule, use the Startup keyword:

```
<Startup>_
Rule Other
        Startup MyRule
End Rule
<OnPoll(60)>_
Rule MyRule
    ...
End Rule
```

The OnEvent Attribute

The OnEvent attribute is used to execute a rule asynchronously based upon detection of an Event Log event. Unless it is coupled with the Startup attribute, the rule is not active until activated by another rule.

```
<OnEvent("...UriToEvent")>_
Rule MyRule(Event as Object)
    ...rule body
End Rule
```

For example,

```
<Startup, OnEvent("Global/Application",
"Global/Application/*[_System][EventId=1002]")> _
Rule MyRule( )
    'my code...
End Rule
```

The Do . . . Loop Poll Block

Poll is used to set up a continuous polling loop. Typically, these loops run forever in order to perform a continuous polling task. In conventional systems, this type of construct would be a serious error, as computer resources are permanently tied up in order to execute this sequence. Poll is used in combination with Do and Loop in a manner similar to the way While works:

```
Do Poll <Time>
    ...statements
Loop
Do
    ...statements
Loop Poll <Time>
```

The Poll keyword causes the loop to execute and then wait for the polling interval to expire before it repeats again. Poll is not equivalent to Sleep, in that it takes into account the amount of time elapsed to execute the body of the loop. For example, if a polling loop is sixty seconds and the body of the loop requires fifty seconds, then Poll only blocks for the remaining ten seconds. The Poll keyword requires an argument of either a TimeSpan object, or a simple integer variable or constant that represents the number of seconds. All integer types (e.g., unsigned, signed, 32-bit, and 64-bit) are compatible:

```
Do Poll new TimeSpan(0, 0, 30)    '30 seconds
    ...statements
Loop
'-----------------
Do
    ...statements
Loop Poll 30            '30 seconds
'-----------------
Dim i as Integer
i = 30
Do Poll I         '30 seconds
    ...statements
Loop
```

Since the user may need to control whether the loop waits on the first execution or executes once and then waits, the Poll keyword can be placed at the beginning or the end of the loop. If Poll is placed at the beginning, an initial block occurs. If Poll is placed at the end, the loop executes once and then waits.

If the body of the loop requires a longer period of time to execute than the polling interval, it waits until the next polling interval before another iteration is executed. An event is issued by the RDL runtime to notify users that the loop cannot execute in the specified time. For example, consider a polling loop configured for sixty seconds with the body of the loop requiring seventy seconds to execute. The loop will execute for the full seventy seconds by executing over the first 60-second period and extending execution ten seconds into the second 60-second time period. Once completed, the start of loop execution for the next cycle begins at the beginning of the third 60-second window (or the 120-second mark).

While a second execution should have occurred at the beginning of the second 60-second window (i.e., at the 60-second mark), the first cycle was not finished. Since the next scheduled run is at the 120-second mark, the system waits until then. Thus, all loops run at the modulus of the polling interval, regardless of how long the body takes to execute.

```
Do Poll <TimeSpan or Integer>
    ...statements
Loop
Do
    ...statements|
Loop Poll <TimeSpan or Integer>
```

To exit a polling loop, use the Exit Do construct, as for any other type of Do loop (polling loops can also be nested).

```
Do Poll 60         '1 minute
    i = 1
    Do Poll new TimeSpan(0, 0, 5)    '5 seconds
        i += 1
        If i > 6 Then
            Exit Do
        End
    Loop
    ...
Loop
```

In this case, the outer loop polls at 60-second intervals and the inner loop polls at 5-second intervals for six repetitions (or thirty seconds total). The outer loop can likely retain its meaning, providing the other supporting code within the loop body executes in a reasonably short amount of time. It is the responsibility of the developer to ensure that inner loops complete in time to allow the outer loop to retain its intent.

If the control TimeSpan or integer is a variable (as opposed to an integer constant), it is re-evaluated for each Poll cycle. It may therefore be changed to cause the polling loop to vary between iterations. For example, the original loop may poll at sixty seconds, and in the execution of the body the value is changed to ninety seconds. Whenever a polling time change occurs, the reference time is reset to zero. Therefore, when a change from sixty to ninety seconds occurs, the next execution cycle will be occur in accordance with the new value, or ninety seconds away from when the change was made. Similarly, if the interval is shortened from sixty to thirty, the next execution cycle will be thirty seconds away from the time the change was made.

Within Block

Within is used to limit the time of execution of a block of code. Conceptually, it is similar to an exception, but the exception is raised if the block takes too long to execute rather than on an error condition.

```
Within <Time>
    ...statements
Else
        ...Statements which execute on timeout
End Within
    ...Resumes execution here
```

When execution enters the Within block, a timer is started. If the code does not reach the end of the block within the specified time, the execution is marked as expired by the engine and control is transferred to the Else clause in the following manner. If the engine is currently executing code in the Within that is executing external code, the engine will transfer control to the Else block using a separate thread—when the thread in the Within block returns, it will yield to the engine immediately and the thread will be released. If the engine is executing code in the Within that is purely VBR code, the engine will wait for the block to yield and then begin execution in the Else block—note that the engine will not enter a long call in the Within block once an expiration occurs, a yield will always occur prior to a potentially long external call. The intent is that the Else block raises an Alert or issues some other warning.

Once either the Within block or the Else block have completed, execution resumes at the first statement after the End Within statement. In practice, the Else block should set a variable to indicate that the Within block has taken too long to execute and should terminate early. To exit any part of the Within block, use Exit Within. The following design pattern is recommended:

```
Dim terminate as Boolean
terminate = false
Within 5000
    ..Statements
    If terminate Then
        Exit Within
    End If
    ...more statements
    If terminate Then
        Exit Within
    End If
    ...more statements
Else
    terminate = true
    ...issue alert or other warning
End Within
    ...resume normal execution once both blocks have completed
```

Tasks

Tasks are concurrent execution units and behave like threads. Tasks are typically used to create multiple instances of a given rule. Since the number of tasks can run into the thousands, tasks are implemented in a special way and are not equivalent to threads. The RDL runtime engine shares a thread among many tasks for efficiency.

In the example below, a rule has been written that checks a disk for free space.

```
Rule CheckDiskRule(Drive as string, RequiredFreeSpace as Uint64)
    Do
        ...logic to check the free space
    Loop Poll 60
End Rule
```

The loop runs forever at a 60-second polling loop. The user would like to run several instances of this rule, one for each drive that should be monitored. Thus, a task is required for each instance. Typically, the user declares a task object for each required task and uses the Start keyword to launch a concurrent execution of the rule.

```
Rule Main
    Dim t1, t2 as Task
    t1 = Start CheckDiskRule("c:", 15000000)
    t2 = Start CheckDiskRule("d:", 20000000)
    ...
```

In the previous example, CheckDiskRule executes two concurrent tasks, once for drive "C:" and once for drive "D:".

This is called explicit task creation. Tasks are also created implicitly in a variety of circumstances.

Tasks can be created explicitly using the Start keyword and a Task object. In the following example, two task objects are declared and the tasks are started with the Start keyword.

```
Rule Main
    Dim t1, t2 as Task
    t1 = Start RuleX(100)
    t2 = Start RuleX(200)
    ...
```

If the task object is not required, it can be reused or omitted altogether:

```
t = Start RuleABC(10)
t = Start RuleABC(20) |
t = Start RuleXYZ( )
Start MyRule("10", 200)
Start AnotherRule(20310)
```

The Task object can have several methods that can be used to control or query tasks, one of which is Task.Stop.

```
t = Start RuleABC(10)
...
t.Stop( )
```

Task.Stop causes the referenced task to stop at the first available safe opportunity. The system ensures that the task does not stop in the middle of an operation.

Tasks are implicitly created when the Startup attribute is used on a rule:

```
<Startup>_
Rule MyRule
    ...rule body
End Rule
```

All rules with the Startup attribute run when the rule file is loaded by the system. Similarly, a separate task occurs when an OnEvent attribute is used to launch a rule. The task has the duration of the processing of the current event or message.

A monitoring function library contains helper functions to ease implementation of common operations. In order to use the monitoring functions library its namespace can be referenced by using the following statement.

imports System.Management.Monitoring.Functions

RaiseEvent( )

The RaiseEvent function forwards an Event Log event to a supervisor. The following illustrates the function signature.

```
void
RaiseEvent(
    int eventID,
    string eventXML,
    bool insertInDatabase,
    bool reliable
);
``` where, eventID specifies the an Event ID, eventXML specifies the content of the event, insertInDatabase is reserved, and reliable is a flag to specify reliability of transmission. The following exceptions apply.

| Exception Type | Condition |
| --- | --- |
| ArgumentNullException | eventXML parameter was null |
| ApplicationException | Failure to place event into the Event Log |

In order to view Event Log events or alerts, an event Viewer is used, as described herein with the model-based management system.

ForwardEvent( )

The ForwardEvent function allows the forwarding of a Event Log event to the supervisor that deployed the rule from which the function is called. If the rule was submitted locally using the command line tool, the event is not forwarded but it is created in the local Global/Application channel. The following shows the function signature.

```
void
ForwardEvent(
    string eventXML,
    bool insertInDatabase,
    bool reliable
);
``` where, eventXML specifies the content of the event, insertInDatabase is reserved, and reliable is a flag to specify reliability of transmission. The following exceptions apply.

| Exception Type | Condition |
| --- | --- |
| ArgumentNullException | eventXML parameter was null |
| ApplicationException | Failure to place event into the Event Log |

RaiseAlert( )

The RaiseAlert function allows the forwarding of an alert to the supervisor that deployed the rule from which the function is called. If the rule was submitted locally using the command line tool, the alert is not forwarded, but it is created in the local Global/Application channel. RaiseAlert has two supported signatures, as described below.

RaiseAlert( ) Full Signature:

```
void
RaiseAlert(
    string alertTypeName,
    string alertInstanceID,
    string alertSource,
    string embeddedEventXML,
    string customXML,
    string message
);
``` where alertTypeName specifies the type of alert being sent, alertInstanceID specifies the instance of the alert, alertSource is the source of the alert if it is other than the local computer (left blank if it a local computer), embeddedEventXML specifies the XML of the event that caused this alert, custom-XML is additional XML, if needed (defined and understood by the author), and message is the text message of the alert. The following exceptions apply.

| Exception Type | Condition |
| --- | --- |
| ArgumentNullException | If any of the parameters are null |
| ApplicationException | Failure to place event into the Event Log |

RaiseAlert( ) Simplified Signature:

```
void
RaiseAlert(
    string message
);
``` where message specifies the text message of the alert. The following exceptions apply.

| Exception Type | Condition |
| --- | --- |
| ArgumentNullException | If any of the parameters are null |
| ApplicationException | Failure to place event into the Event Log |

EXAMPLE

Monitoring CPU Utilization

CPU utilization is one of the performance counters most commonly used to verify the correct functioning of a server or workstation running the an operating system. A very high CPU utilization can, over time, affect the capability of the operating system to perform as designed, and is often a symptom of a malfunctioning component.

The RDL rule below is designed to retrieve the CPU utilization every five seconds and generate an event log event if the sample is above a ninety-percent threshold.

```
********* CpuSample1.rdl *********
imports System
imports System.Threading
imports System.Diagnostics
imports System.Management.Monitoring.RulesEngine
imports System.Management.Monitoring.Functions
Namespace Microsoft.Windows.Monitoring
    Module Performance
        <Startup, OnPoll(5L)> _
        Rule CheckCpuUsage( )
            Dim CpuSample As PerformanceCounter
            CpuSample = new PerformanceCounter("Processor","%
        Processor Time","_Total")
            CpuSample.NextValue( )        'First invocation always returns 0
            If (CpuSample.NextValue( ) > 90.0) Then
                RaiseEvent(99, "Processor utilization is too
                    high!", true, true)
            End If
            Return true
        End Rule
    End Module
End Namespace
```

EXAMPLE

Consolidating Events

The CpuSample1 code has a clear limitation that can result in a flood of events in the Event Log if the CPU utilization is frequently above the threshold. To avoid this potential side effect, the previous rule can be modified to aggregate these events and result in a summary event every five minutes that shows the number of times a high CPU utilization condition was detected. The following rule CpuSample2.rdl illustrates how this can be accomplished.

```
********* CpuSample2.rdl *********
imports System
imports System.Xml
imports System.Threading
imports System.Diagnostics
imports System.Management.Monitoring.RulesEngine
imports System.Management.Monitoring.Functions
Namespace Microsoft.Windows.Monitoring
    Module Performance
        <Startup> _
        Rule CheckCpuUsage( )
            Dim cpuCounter As PerformanceCounter
            cpuCounter = new PerformanceCounter("Processor","%
        Processor Time","_Total")
            While True
                Dim timer As Integer = 0
                Dim eventcounter As Integer = 0
                cpuCounter.NextValue( ) 'First invocation always
                    returns 0
                Do
                    If (cpuCounter.NextValue( ) > 50.0) Then
                        eventcounter = eventcounter + 1
                    End If
                    timer = timer + 1
                    If timer > 60 Then
                        Exit Do
                    End If
```

```
            Loop Poll 5L
                MonitoringSystemFunctions.[RaiseEvent](199,
            eventcounter.ToString( ), true, true)
            End While
            Return true
        End Rule
    End Module
End Namespace
```

EXAMPLE

Administrator Alerts

When a detected condition demands the administrator attention, a rule can be configured to generate an alert. The following code sample illustrates how the monitoring standard function RaiseAlert( ) can be used for this purpose. Note also use of the OnEvent attribute to trigger the rule execution on the occurrence of event 199 generated by the above rule in CpuSample2.rdl.

```
'          ********* CpuSample3.rdl *********
imports System
imports System.Xml
imports System.Threading
imports System.Diagnostics
imports System.Management.Monitoring.RulesEngine
imports System.Management.Monitoring.Functions
Namespace Microsoft.Windows.Monitoring
    Module Performance
        <Startup, OnEvent("Global/Application",
        "Global/Application/*[_System][EventId=199]")> _
        Rule RaiseAlertOnCPUTooHigh(ByVal EventData as String)
            Dim CountNode as XmlNode
            Dim Count as Integer
            Dim xmlDoc as XmlDocument = new XmlDocument( )
            xmlDoc.LoadXml(EventData)
            CountNode = xmlDoc.SelectSingleNode("//EventXML")
            Count = Convert.ToInt32(CountNode.InnerText)
            If Count > 5 Then
                    RaiseAlert ("Attention: High CPU Utilization was
                    detected.")
            End If
        End Rule
    End Module
End Namespace
```

EXAMPLE

Remote Machine Monitoring

The following rule can be used to monitor the CPU of a remote machine from a monitoring supervisor.

```
           ********* CpuSample4.rdl *********
imports System
imports System.Threading
imports System.Diagnostics
imports System.Management.Monitoring.RulesEngine
imports System.Management.Monitoring.Functions
Namespace Microsoft.Windows.Monitoring
    Module Performance
        <Startup, OnPoll(5L)> _
        Rule CheckCpuUsage( )
            Dim CpuSample As PerformanceCounter
            CpuSample = new PerformanceCounter("Processor","%
```

```
Processor Time","_Total")
            CpuSample.NextValue( )           'First invocation always
returns 0
            Do
                If (CpuSample.NextValue( ) > 90.0) Then
                    RaiseAlert ("MonitoringManifest-5.1.0.0-
CPUAlert", " ", "Cpu Usage is
high!")
                End If
            Loop Poll 5L
            Return true
        End Rule
    End Module
End Namespace
```

The execution of RDL rules is governed by a runtime engine as part of the monitoring service. Furthermore, RDL is instrumental to application of a diagnostic model that defines, for example, phases of detection, diagnosis, and recovery.

RDL Examples and Syntax

Described herein is a common syntax for use by a monitoring system for rules, constraints, assertions, and inferences. Hereinafter, the syntax will be referred to (RDL).

In one implementation, RDL is based on Visual Basic NET syntax (also abbreviated as VB.NET) by Microsoft Corporation, with additional restrictions and extensions for suitable use by an inference engine. However, any suitable software can be used to benefit from the disclosed rules mechanism.

The purpose of RDL is to test assertions, enforce constraints using runtime information, make inferences, perform correlation and communicate the results of dynamic tests to other components. It is the basis of intelligent response and corrective actions in management of applications and services.

RDL has a number of special constructs to make it easy to use in the "rule" space, and uses managed code. In one implementation, the engine runs as a standalone service.

In RDL, there are many little rules which execute based on external events, and many which execute at polling intervals. The total number of rules is very large and rule execution is prioritized and scheduled. Some rules are polled, and some rules execute based on external events. Many rules also require correlation with each other.

RDL provides primitives for automatically correlating asynchronous observations from different sources, eliminating the need to write sophisticated and synchronized multi-threading code.

In a monitoring environment, it is expected that many users will change thresholds, constants, and even turn sets of rules off or on. Users will add their own additional tests to standard tests, and will want to perform new actions in addition to the original actions. This is supported without forcing the administrator to touch the original rule code. RDL solves this by providing a very loose extension model more suited to a monitoring environment. The model is optimized for quick "patching" as opposed to rigorous Object Oriented based extensions.

RDL Syntax

Following is a brief overview of the RDL syntax. The RDL rules program uses the following skeleton arrangement:

```
      Imports ...' List of rules/functions/objects imported from outside
      Namespace Rules.Name.Name2.Name ' Rules Namespace of this RDL
script
            Public Group Name
                ...Rule bodies
            End Group
End Namespace
```

The namespace name begins with Rules in all cases, but follows a dot-separated pattern. The Imports statement lists the other namespaces from which rules or supporting code will be imported in this rules document. All rule bodies are enclosed in Groups, which are simple scoping mechanisms. Groups are used to segregate rules into useful collections, e.g., like "Security Rules", and "Performance Rules".

The following example shows a rule for checking free disk space. The rule is "reusable" like a function and must be launched from another rule with the correct parameter.

Any rule marked with a <Startup> attribute is automatically executed when the rule document is loaded by the engine. In this case SetupDiskChecks will be executed. In turn, this rule launches three instances of CheckDisk, one for each of the listed drives.

The Run keyword launches a logical thread against the specified rule and immediately returns, so the net result of SetupDiskChecks is to create three logical threads of execution against CheckDisk. Since CheckDisk is marked with a Poll attribute, those threads will keep calling the function every thirty minutes with the specified arguments.

Following is an example of a facility unique to the RDL where no threading or synchronization knowledge is required. The author simply concentrates on how to express the rule.

```
      <Startup>
      Rule SetupDiskChecks
            Run CheckDisk("c:", 500000)
            Run CheckDisk("d:", 600000)
            Run CheckDisk("e:", 1230000)
      End Rule
      <Poll(Minutes(30))>
      Rule CheckDisk(Drive as string, Limit as Uint64)
            Dim FreeSpace as Uint64
            FreeSpace = WmiGet("#microsoft/os/storage/disk/{0}/freespace",
Drive)
            If FreeSpace < Limit Then
                  RaiseEvent("Disk drive {0} is below the limit!", Drive)
            End If
      End Rule
```

Within the rule body WmiGet is used to access instrumentation items using an instrumentation catalog. This catalog exposes a uniform resource identifier (URI) model for every dynamic data point, every method, job, and configuration item in the operating system. In essence, most items that can be monitored by making a call can be reached by this method.

The RaiseEvent call is used to create a new event to record that a low-disk-space condition was detected. Anyone monitoring for this event will get activated (probably in some unrelated rules). Of course, direct action can be taken within the rule definition, such as running a script or a job.

To execute, a RDL program has at least one "Task" running. A task is conceptually similar to a thread. For example, an active polling loop would be considered a task. The typical RDL program has many tasks running at once on various schedules and on the receipt of asynchronous events. A program with no tasks does not execute. It is legal to produce a rules program with no tasks. The rules inside such a program are seen as helper rules to be used by other rules programs. There are several techniques for creating tasks: mark a rule with the <Startup> attribute; mark a rule with a signaling attribute such as <OnEvent( )>; and explicitly creating a task using the Task object.

Every RDL source with at least one <Startup> attribute has one task, and can run as a program. If there are no <Startup> attributes, the module is a library and the rules are referenced only from other rules. All programs, therefore, have at least one rule marked as Startup in order to launch that program.

```
            <Startup>
            Rule Main
                ...
            End Rule
```

This corresponds to a "Main" function in C++/C#, etc. However, in RDL, many rules can start this way, since most rules are self-contained.

```
            <Startup>
            Rule SecurityCheck
                ...
            End Rule
            <Startup>
            Rule2 ConfigCheck
                ...
            End Rule
```

Once a rule is running, a Task exists. Above, there are two tasks, once for each Startup rule. If the logic within the rule body allows that rule to terminate, the task count drops by one. Eventually, the task count drops to zero and the program terminates.

To keep rules running, therefore, they need to remain as active tasks. This can be done by making the rule body execute in an infinite loop with suitable timeouts to keep the rule from running all the time.

```
<Startup>
Rule MyPerpetualRule
    Do
        Sleep(Minutes(5))
        ...other logic
    Loop
End Rule
```

Alternately, a rule can be marked with a Polling attribute.

```
<Startup, Poll(Minutes(60))>
Rule MyRule
    ...
End Rule
```

Similarly, rules can be attached to event subscriptions or other signals to keep the task alive. To terminate a specific task, use Stop(Me) from within that task. To stop all tasks, execute Stop.

New tasks may also be explicitly created using the Task helper object, which can create new tasks, create polling-based tasks, etc.

```
<Startup>
Rule Main
    Task.Run(RuleA)
    Task.Run(RuleB)
    Task.Poll(Seconds(60), RuleC)
    ...
```

RDL does not directly expose threads. Rather, everything is expressed as a Task and RDL maps threads to the various tasks that need execution, often using the same thread to execute several tasks simultaneously. Because RDL does not have threads, the logic in many rules can be safely expressed as infinite-loop constructs, which is often the most natural way to express an ongoing rule. For rules which do not have parameters, it is possible to specify execution entirely with attributes and not use the Run command.

```
<Startup, Poll(Minutes(60))>
Rule DoThisEveryHouse
End Rule
```

The Startup attribute causes the rule to run once at startup, but the Poll attribute is then taken into consideration, causing the rule to run automatically every hour.

A rule body has a Boolean return type.

```
Rule MyRule
End Rule
```

```
Function MyRule as Boolean
End Function
```

If no return value is specified, the rule returns FALSE by default. Functions may return arbitrary types, but rules return Boolean values. Subroutine procedures are available by using objects which have been imported into the system, but are not definable within RDL. This is because RDL is a monitoring language and, higher-order monitoring and inference logic is really based on predicate logic and Boolean algebra, which in turn is based on the assumption that the various primitive rules are returning TRUE or FALSE for everything that happens. Both rules and functions can have parameters, which can be passed either by value or by reference:

```
Rule MyRule(ByVal X as String, ByRef Y as Object)
    ....
End Rule
```

Some rules only require a label:

```
Rule DiskRule
    If GetDiskSpace("C:") > DISK_LIMIT
        Then Action( )
    End If
    Return True
End Rule
```

Here, the rule is hard-coded to use the C: drive for the test. A rule can be parameterized so that the required drive letter can be passed in, and the series of tests performed on it symbolically.

```
Rule DiskRule(DriveLetter as String)
    If GetDiskSpace(DriveLetter) > DISK_LIMIT
        then action
    End If
    Return True
End Rule
```

Practically all reusable rules are of this form. The return value of a rule should be carefully considered, because reusable rules will be usually composed into more complex rules.

```
Rule TestAll
    If DiskRule("C:") and DiskRule("D:")
    Then
        Report("All disks ok")
        Return True
    End If
End Rule
```

If DiskRule always returns True whether it succeeds or fails (as in the previous example), the meaning of TestAll is compromised. Usually "testing" rules are coded to return TRUE if the test succeeds and FALSE if it fails. A code path without an explicit return implicitly returns FALSE. By thinking about returning True or False in all cases, higher-order rules can be reliably written using the simpler rules. Most testing rules should not take corrective actions. Instead, the higher-order rule should.

```
Rule DiskRule(DriveLetter as String)
    If GetDiskSpace(DriveLetter) > DISK_LIMIT
        Return True
    End If
    Return False
End Rule
Rule TestAll
    If DiskRule("C:") = FALSE Then
        CorrectiveAction("C:")
    End If
    If DiskRule("D:") = FALSE Then
        CorrectiveAction("C:")
    End If
    Return True
End Rule
```

Comments terminate at the end of the current line.

```
'This is a comment
REM This is a comment
Rule ThisIsNotAComment
    ....
End
```

Variables, Constants, and Collections

Variables and constants are declared, and option explicit is assumed, requiring that all variables are declared and typed before use.

```
Rule MyRule
    Dim I as Integer, V as String
    Dim MyList as ArrayList
    Const X as Integer = 100
```

The ArrayList type is the sole collection or array type which can be declared for use in RDL. Global constants are permitted.

```
Namespace Rules.MyCorp.MyRules
    Const Limit as Integer = 100
    Rule R1
    ...
```

Types

RDL supports all basic types.

```
Dim x as Integer, v1 as string, v2 as Uint64, v3 as Double, v4 as Uint16
```

RDL supports variable, constant, and type declarations. Within a function or a rule, DIM is used to predeclare all variables and constants before use.

```
Rule R1
    Dim I as Integer, Msg as String, X as Xml
    Const Max as Integer = 300
    ...
```

RDL supports the following base types: Int32, Uint32, Int16, Uin16, Int8, Uint8, Byte, Char (UNICODE only), Int64, Uint64, Integer (same as Int32), Double, String, Object, and XML.

The class ArrayList is available for array support.

```
Rule R2
    Dim Names as ArrayList
    Names.Add("StringA")
    Names.Add("StringB")
```

Enumeration types are also supported:

```
Enum Color
    Red = 1
    Green = 2
    Blue = 3
End Enum
```

There are several special types in RDL for special situations. There is a dedicated XML type that makes it easy to access XML-based data without having to use complex XML objects.

```
Dim doc as Xml
Dim s as string
```

Note that for simple XML which has non-repeating elements, the element values can be accessed directly using the built-in XPath accessor available on all XML variable types. Assuming the following XML fragment.

```
<MyXml>
    <ElementA MyAttrib="xyz">  abc
        <ELementB>  def </ElementB>
    </ElementA>
</MyXml>
```

The Xml type can access the various portions of the above fragment like this.

```
Dim x as Xml, s as String
    x = WmiGet("...")    ' Get the Xml from somewhere, such as WMI
    s = x.XPath("MyXml/ElementA/ElementB")
```

Structured types are also supported. A Structure declaration is a type-definition, not an instance of a structure.

```
Structure MyStruct
    X as Integer
    Y as Integer
End Structure
```

Each declared structure may be moved to and from the Xml type:

```
Dim s as MyStruct, x as Xml
    s.X = 100
    s.Y = 200
    x = s.ToXml("Wrapper")         'Builds a chunk of Xml
<Wrapper><X> 100 </X> <Y> 200 </Y> </Wrapper>
    s = x.ToStruct(MyStruct)       'May fail if Xml is not structurally
compatible with the struct type
```

RDL also has a Call type which is able to express the call of a rule itself. This is similar to a function pointer, but has significant differences. This is covered in more detail later.

Expression Syntax

The expression syntax for arithmetic, Boolean, and string expressions.

```
y = (i * 2 + x)/i
If y > x Then
strval = "ABC" & strval2        'Concatenation
```

The carriage-return-linefeed is a statement or expression terminator, thus the "_" character may be used for long statements.

```
Rule R1
    If Get("wmi:/os/disks!c:!Freespace") <= 1000000 and _
        Get("wmi:/os/disks!c:!NTFS") == TRUE
    Then
        Event(102, "NTFS drive C: has low disk space")
    Else Return True
    End If
    Return False
End Rule
```

Classes and Objects

Classes or objects are implemented in, e.g., VB.NET, C#, J#, for use within RDL. RDL supports all the normal conditional and branching constructs, including IF and SELECT/CASE statements.

```
Rule MyRule(V as Integer)
'-----If / Else ------------
    If V >= 2 and V <= 10 Then
        ...
    Else If V == 100 Then
        ...
    Else
        ...
    End If
'---- Select/Case --------
    Select V
        Case 1 to 5
```

-continued

```
        ...
        Case 6
        ...
        Case 7 to 10
        ...
        Case Else
        ...
    End Select
End Rule
```

Looping Constructs

RDL supports standard looping constructs: For; ForEach, While, Do, Loop, etc. Note that the Do/Loop has a number of possible layouts for where the condition is expressed, the top or bottom of the loop, and the polarity of the expression (Until or While).

```
'While ----------
    While V > 100
        ...
    End While
'For Loops ---------
    For i = 1 to 10
        ...
    Next
    For Each strVal in MyArray
        ...
    Next
' Do Loops ----------
    Do
        ...
        Loop Until X = 100
    Do
        ...
        Loop While X < 100
    Do While X = 1
        ...
    Loop
    Do Until X = 3
        ...
    Loop
    Do
            ...forever
    Loop
```

Strictly speaking, all loops can be expressed using the While alone. The use of the various constructs is often a matter of personal taste. Note the special case of an infinite loop using Do . . . . Loop with no exit condition. This is often useful within RDL to express rules which logically run forever. Note that For Each is the preferred construct for iterating through ArrayList types. Note also that each looping construct requires a specific Exit statement to break from it: Exit While, Exit Do, and Exit For.

Attributes

RDL uses many types of attributes to control the execution model and eliminate the need to write code. Attributes may be imported.

```
<Description("This rule is My Rule and nobody else's")>
Rule MyRule
```

RDL defines a number of standard attributes for execution control, correlation, and documentation.

Classes

Classes can be defined in, e.g., C#, and imported into the RDL space for use. The entire rule program can be stopped by executing the STOP command in a rule body

```
<Poll(Minutes(30))>
    Rule CheckDisk(Drive as string, Limit as Uint64)
        Dim FreeSpace as Uint64
        FreeSpace = Sys.Get("#microsoft/os/storage/disk/{0}/freespace", Drive)
        If FreeSpace < Limit Then
            WinEvt.RaiseEvent("Disk drive {0} is below the limit!", Drive)
        Else
            Stop
        End If
    End Rule
```

This halts the entire set of rules in the current program by stopping all tasks.

More interesting is the case of stopping a specific task. For example, if the above rule is running three logical threads, one for C:, D: and E: drives, the construct Stop(Me) only halts the current task, leaving the others running:

```
....same as above....
If FreeSpace < Limit Then
    WinEvt.RaiseEvent("Disk drive {0} is below the limit!", Drive)
Else If Drive = "C:"
    Stop(Me)
End If
End Rule
```

Coding Styles for Rules

Independent rules are generally coded in one of two ways: as infinite loops or as event-driven callbacks. The execution model of RDL is arranged so that these are of equivalent efficiency. Often it is easier to understand a pattern of correlation if the problem is expressed as an infinite loop. In the example below, a performance counter value is checked to see if it is increasing, and if it increase for ten minutes straight, an action is taken. This is easy to express as an infinite loop:

```
Rule CheckRisingPerfCounter
    Dim v1, v2 as Uint64, MinuteCounter as Integer
    MinuteCounter = 0
    v1 = WmiGet("perf/os/base/commitcharge")
    Do
        Sleep(Minutes(1))
        v2 = WmiGet("perf/os/base/commitcharge")
        If v2 >= v1 Then
            v1 = v2
            MinuteCounter += 1
        Else
            MinuteCounter = 0
        End If
        If MinuteCounter = 10
            TakeAction( )
            MinuteCounter = 0
        End If
    Loop
End Rule
```

Since RDL has no threads, the infinite loop is not a problem.

The other primary type of coding style is the callback-based rule, which implies a queue of items which exist and are "fed" into the rule asynchronously as they occur. The most obvious of these is the Poll callback.

```
<Poll(Seconds(120))>
    Rule MyRule
        ... run this every 2 minutes
    End Rule
```

The item being "queued" here is a signal every two minutes. The other type of callback is the OnEvent case, in which a URI-based source that can emit data items asynchronously delivers them to the callback:

```
<OnEvent("redman/application/event[id=101]")>
    Rule MyRule(Data as Xml)
    ...
    End Rule
```

There are several built-in sources. However, the above mechanism is implicitly extensible to any required asynchronous source. In general the mapping of external signal sources to the OnEvent construct is done by directly programming the RDL runtime through its API (application program interface) set, as opposed to being a language construct. This allows developers to map other sources, such as SNMP (Simple Network Management Protocol) traps, network traffic, and various change-notification mechanisms to the OnEvent construct. All OnEvent URI constructs are registered in the instrumentation catalog.

Subscribing

A rule based on an Event Log subscription is easy to specify and requires a specific signature. To run a rule at startup which automatically executes every time a specific event occurs, place the subscription in an OnEvent attribute, and place the Startup attribute on the method to ensure it begins executing immediately.

```
<OnEvent("Microsoft.WinEvent!/application/product/event<id=101>"), Startup>
    Rule OnEvent(ByVal EventData as Xml)
    End Rule
```

Xml is a native data type in RDL. Since all events have an XML rendering, this signature will work for all event types. XML fields can be addressed within the language using dot notation, as if the XML were a structure:

```
<OnEvent("Microsoft.WinEvent!/application/product/event<id=101>"), Startup>
    Rule OnEvent(ByVal EventData as Xml)
        If EventData.__System.Publisher = "SQLSERVER" Then
        ....
        End If
    End Rule
```

Alternately, built-in helpers member methods on the XML data type are also available:

```
If EventData.XPath( "_System/Publisher") = "SQLSERVER" Then
    ....
End If
```

Correlating Events

A rule may be subscribed to several events at the same time. This technique allows events to be correlated in time. In the example below, there are two subscriptions, each with an associated variable which appears in the Function signature. As A and B become available, they are queued within the RDL runtime. As soon as there is at least once occurrence of each, the rule is called by dequeuing one of each event:

```
<OnEvent("Microsof.WinEvent!application/sqlserver<id=1230>", A),
 OnEvent("Microsof.WinEvent! application/sqlserver<id=1231>", B),
 Queued(A, 10, Minutes(60)), Queued(B, 10, Minutes(60))>
Function SqlLowDisk(ByVal A, B as Xml) as Boolean
    Dim Interval as Date
    Interval = A.TimeOf - B.TimeOf
    If Interval < Seconds(30)
        RaiseAlert("Sql Events 1230/1231 occurred" & _
            "Indicating corrupt database")
        Return False
    End If
    Return True
End Function
```

The above rule body checks to see if the two events have occurred within a specific interval of each other. Because there is an implied queue for each of the A and B values, some form of explicit queue control is needed. Note that the queue size for each of A and B is specified explicitly as ten and that no item should be older than sixty minutes.

In general, whenever queued variables occur within RDL, they are automatically dequeued, as above, and delivered to the required function. However, if the function wishes to match up a particular A item against a particular B item, it may be necessary to explicitly manipulate the implied queue. This can be done through several primitives. Once a variable has been marked as <Queued>, several methods and properties are available on it.

| | |
|---|---|
| A.Keep( ) | 'Push the current value back into the head of the queue |
| A.Enqueue( ) | 'Return item to the tail of the queue |
| A.Peek( ) | 'Return the next value in the queue without dequeing it |
| A.Empty( ) | 'Clear the queue |

Note that a queued variable is at once a "queue" and its currently most-recently-dequeued value.

Exceptions and Errors

RDL supports exception handling indirectly. This is because if a rule cannot succeed in the monitoring space, it is likely that an alarm is required anyway. At present, an exception occurring within a rule body internally raises an event indicating that a rule failed due to an internal exception. Rules that handle exceptions for other rules may be written to at least process the fact that another rule cannot succeed. The following rule is invoked whenever rules R1, R2, or R3 fail due to an internal exception:

```
<Catch(R1, R2, R3)>
Rule Handler(R as Call)
End Rule
```

Polling rules that have a runtime exception continue to execute at their next scheduling polling time. Event-based callback rules will continue to execute when another event occurs.

Conditional Polling

Rather than specifying polling as an attribute, where is not conditional, it can be dynamically achieved within a rule. If a condition occurs which triggers a specific polling operation, this is coded by making a call to Task.Poll.

```
If x > 10 Then
    Task.Poll(Minutes(60), MyRule(x))
End If
```

Looping and Recursion

Because RDL does not use "real" threads for sequences, it encourages the use of infinite loops and recursion to model continuous tests and time-based analysis. It is easy to implement a complex time-based rule using recursion or looping. Consider that it is desired to check for increasing memory usage of a process, and for any given process ID (PID) an accessor function is employed to take a snapshot of the memory being used by that process. What is desired, is to take a snapshot of the memory usage, wait a while (an hour, for example) and check it again to see if the memory usage has increased. One way to do this is with self-recursion. The rule runs "forever", using the old value and the new value after waiting a specific time.

```
<Startup>
Rule S
    Dim PID as Integer
    Dim StartMem as Int64
    PID = WmiGet("#windows.os.process.pidFromName/notepad")
    Startmem = GetProcessMemory(PID)
    While True
        Wait(Hours(1))
        NextMem = WmiGet("#windows.os.processmemory" &
            CStr(PID)
        if StartMem - NextMem > 1200000 then
            RaiseEvent("Memory Leak")
            Stop(Me)
        end if
    End While
End Rule
```

Instead of terminating with Stop(Me), we could reset the memory values and start over.

Time Series Analysis

RDL allows a time-series problem to be explicitly modeled using time constructs, instead of requiring a low-level indirect asynchronous coding model. Note that while the thread appears to "Sleep" in the code below, the RDL runtime does not actually implement the code as a thread which goes to Sleep.

```
<Poll(Minutes(15)), Startup>
Rule CheckForRunawayIIS
    dim pid, cpuA, cpuB, cpuC as uint32
    pid = WmiGet("ms/os/process/Name/{0}/Pid", "iis")
    cpuA = WmiGet("ms/os/perf/process/{0}/cputime", pid)
    Sleep(Minutes(1))
    cpuB = WmiGet("ms/os/perf/process/{0}/cputime", pid)
    Sleep(Minutes(1))
    cpuC = WmiGet("ms/os/perf/process/{0}/cputime", pid)
    If cpuA > 95 and cpuB > 95 and cpuC > 95 Then
        ReportAlert("IIS appears to be hung at 95% CPU")
        return False
    End If
    Return True
End Rule
```

When the Sleep( ) calls occur, the thread is actually used for other rules which need servicing. However, this simple coding model allows time-based problems to be easily modeled.

Constraining Code Over Time

In monitoring situations, code often has a time constraint. If the code cannot execute within a specific amount of time, then another course of action needs to be taken. This is an explicit operation in RDL.

```
Rule R1
    Within Seconds(60)
        ...code
    Else
        ...timeout code
    End Within
```

This is conceptually the same as a Try/Catch block, with Time being the thrown exception.

Extension

RDL has a well-developed extension model based on observed needs of administrators and IT professionals in the field for situations in which constraints and rules are being applied to monitoring systems. These constructs allow the user to add an extension to a rule without modifying it. In essence, the original rule that is desired to be modified is indicated, and it is "patched" from the outside to include the new behavior. This is preferable to modifying the existing logic, which results in difficulties with versioning, overwriting updates, and similar problems. These extension constructs have been collapsed to three basic constructs: Extend, for extending a logical rule to allow an alternate test before allowing it to fail by returning FALSE (the original author forgot something); Constrain, for constraining a logical rule to make its test more stringent and possibly "veto" the original rule (the original author was not aware of your constraint or requirement); and Hook, for hooking the original logical rule (the original author's action is fine, but you want to perform an additional action as well) is an extension based on logical OR, (2) is based on logical AND, and (3) is a no-side-effect extension.

All of these mechanisms allow coexistence of multiple similar extensions. The model is: the original rule is executed; the pool of Extend extensions is executed; the pool of Constrain extensions is executed; and the pool of Hook extensions is executed HooHo.

If more than one of each type exists, the order of execution is unspecified and logically irrelevant.

A fourth construct is also available in which the original rule is simply Replaced outright. The signature of an extension matches the signature of the target rule.

Extensions to Tests

Often a built-in rule has a test which needs modification in the field. For example, assume that a test to determine if an application has a valid license is written, and if not, a warning is issued to the event log:

```
Rule CheckApp(ByVal AppId as String)
    If Not AppHasLicense(AppId) Then
        Rdl.ReportAlert("Application " & AppId & " is not licensed")
    End If
End Rule
```

Now, assume that the author of AppHasLicense checked in a database to see if the application was licensed, but it turns out that there may be more than one legal way to determine if an application has a license. The original rule implementation of AppHasLicense could be changed, but this is fragile, since that rule document might be "signed" and inaccessible, or may upgraded in the future by its original author. A way is needed to add in a new test by somehow hooking the old test. This is done by extending the rule with a new rule with the same signature, but another name and adding an attribute to show which original test is being extended:

```
<Extend(AppHasLicense)>
Rule MyAppHasLicense(ByVal AppId as String)
    ...
End Rule
```

All extensions to rules are considered to be a pool of tests. When the caller runs AppHasLicense, the original test is run and if it returns FALSE, the additional rules are also run, until one returns TRUE or they all return FALSE, in which case the rule is considered to have "failed" and the original expression in which the rule was referenced will evaluate to Boolean false. In this way, non-destructive extensions can be written to existing rules. This type of extension is a logical OR of the original rule being extended:

OriginalRuleResult::=OriginalRule OR AnyExtendedRule

If multiple extensions occur, explicit sequencing may be required. Otherwise, the original test is tried first, followed by the extensions in a random order. Extensions of extensions are also allowed.

Constraints to Existing Rules

In some cases, a rule is not stringent enough and, unlike the previous case where any rule returning TRUE was sufficient, it is desired to use the original rule logically ANDed with the new extension, i.e., to constrain the original rule. For example, not only should the AppHasLicense succeed, an additional test is desired to ensure that the application is on the "approved applications list" in order to keep people from being unproductive by playing computer games all day long.

```
Rule CheckApp(ByVal AppId as String)
    If Not AppHasLicense(AppId) Then
        Rdl.ReportAlert("Application " & AppId & " is not licensed")
    End If
End Rule
<Constrain(AppHasLicense)>
Rule Constraint(ByVal AppId as String)
    ...check app to see if it is on approved list
End Rule
```

In this case, the Constrain attribute indicates which rule is being constrained by this new rule. Both must return TRUE in order for the target expression to return True. If multiple constraints occur, explicit sequencing may be required. Otherwise, the original action is executed and then the constraints, in undefined order. Constraints of constraints are allowed. In essence Constraints can be used to "veto" decisions taken by other rules.

Hooks to Existing Rules

Finally, a looser form of extension than the previous two are "hooks" in which it is desired that your code run when a particular rule or action is executed, without affecting the original logic.

```
Rule CheckApp(ByVal AppId as String)
    If Not AppHasLicense(AppId) Then
        Rdl.ReportAlert("Application " & AppId & " is not licensed")
    End If
End Rule
<Hook(AppHasLicense)>
Rule NewAction(ByVal AppId as String)
    ...perform additional auditing operations
```

In this case, the Hook attribute points out which action we want attached (in this case, the AppHasLicense test), and the NewAction will run whenever that code is called. If multiple hooks occur, explicit sequencing may be required. Otherwise the order of hooks is undefined. Hooks may hook other hooks.

Replacing a Rule

A rule may simply replace the original rule completely.

```
<Replaces(OldRule)>
Rule MyNewRule
    ...
End Rule
```

If more than one replacement is detected, an error occurs and the user must make a change.

RDL for Correlation and Inference

Any construct can be limited in time duration using the WITHIN construct. If the statement block cannot complete within the specified time, the ELSE clause is automatically executed.

```
WITHIN Seconds(60)
    Evt1 = Src.GetEvent( )
ELSE
    RaiseEvent(101, "Did not get the event within 1 minute")
END WITHIN
```

This is useful for defining time-based constraints and rules. The most recently evaluated result of a function is available at all times, plus the time of evaluation. In many cases, it is not necessary to reexecute a rule if the information is within the required tolerance. This can drastically speed up evaluation if the basic rule is used many times in other rules.

```
<Tolerance(Time( )) }
```

Rule Report

When a rule fails, it is often useful to get a tree of the sequence which resulted in the final evaluation. Consider a series of rules that decide if a password is strong. The user calls StrongPassword with a test password of "FOO" and wants to know if the password is considered "strong". Many rules may be run against this proposal, and one of them may veto this password as being strong. The user would like a report like the following upon receiving "FALSE" as a result.

```
StrongPassword("FOO") = FALSE
    PasswordTest1 = TRUE
    PasswordTest2 = TRUE
        LengthCheck = TRUE
        MixedCharacterCheck = TRUE
    XXXTest
        UNIXCommonPasswordTest = TRUE
        DifferentFromLastPassword = FALSE
```

Correlation via Rendezvous

```
    Function
 RuleX(A, _)

Function

////////////////////////////////////////////////////////////////
////////////////////
    //
    // Namespace and grouping structure
```

```
//

<Parser> ::= <Imports> <NamespaceDecl>;

<NamespaceDecl> ::= <AttributeList> <Terminator>
                    NAMESPACE <Ident> <Terminator>
                    <Declarations>
                    <RuleGroups>
                    END NAMESPACE <Terminator>;

<Imports> ::= IMPORT <Ident> <Terminator> <Imports>;
<Imports> ::= <>;

<RuleGroups> ::= <GroupDecl><RuleGroups>;
<RuleGroups> ::= <>;

<GroupDecl> ::= GROUP <Ident> <Terminator>
                <Declarations>
                END GROUP <Terminator> %f4;

<Declarations> ::= <Declaration><Declarations>;
<Declarations> ::= <>;

<Declaration> ::= <AccessModifier> <DeclType>;

<DeclType> ::= <TypeDecl>;
<DeclType> ::= <RuleDecl>;
<DeclType> ::= <FactDecl>;
<DeclType> ::= <ConstDecl>;
<DeclType> ::= <Resolution>;

<FactDecl> ::= RESERVED;

<Resolution> ::= RESOLUTION <Ident> EQUALS <Literal>;

////////////////////////////////////////////////////////////////
//
//   User types STRUCTURE, ENUM
//

<TypeDecl> ::= <StructDecl>;
<TypeDecl> ::= <EnumDecl>;

<StructDecl> ::= STRUCTURE <BecomesTypeName> <Terminator>
                 <StructBody>
                 END STRUCTURE <Terminator>;

<StructBody> ::= <StructMemberDecls>;
<StructMemberDecls> ::= <Ident> AS <TypeName> <Terminator> <StructMemberDecls>;
<StructMemberDecls> ::= <>;

<BecomesTypeName> ::= <Ident>;

<TypeName> ::= <Ident> | <StdType>;

<EnumDecl> ::= ENUM <BecomesTypeName> <Terminator>
```

```
                    <EnumBody>
                    END ENUM <Terminator>;

<EnumBody> ::= <EnumDef> <EnumBody>;
    <EnumBody> ::= <>;

<EnumDef>  ::= <Ident> EQUALS <NumericLiteral> <Terminator>;

<ConstDecl> ::= CONST <Var> AS <StdType> EQUALS <ConstSource>;

//////////////////////////////////////////////////////////////////
    //
    //  Attributes <AttributeList> ::=  OPEN_BRACKET <AttributeDecls> CLOSE_BRACKET
<Terminator>;

<AttributeDecls> ::= <Attribute><MoreAttributes>;
    <MoreAttributes> ::= COMMA <Attribute><MoreAttributes>;
    <MoreAttributes> ::= <>;

<Attribute> ::= <Ident> <AttributeParamList>;     // Describes
attr.attr2( ...list )

<AttributeParamList> ::= OPEN_PAREN <AttribValueList> CLOSEPAREN;
    <AttributeParamList> ::= <>;

<AttribValueList> ::= <AttribValue> <AttribValueList2>;
    <AttribValueList2> ::= COMMA <AttribValue> <AttribValueList>;
    <AttribValueList2> ::= <>;

<AttribValue> ::= <Literal>;

//////////////////////////////////////////////////////////////////
    //
    //  Rule body syntax :   RULE or FUNCTION
    //

<RuleDecl> ::= <RuleOrFunc>;

<RuleOrFunc> ::= RULE <Ident> <ParamList> <Terminator>           //
Only allowed to return BOOLEAN from a Rule
                    <RuleBody>
                    END RULE <Terminator>;

<RuleOrFunc> ::= FUNCTION <Ident> <ParamList> AS <FuncReturnType>
<Terminator>
                    <RuleBody>
                    END FUNCTION <Terminator>;

<RuleBody> ::= <VarDeclBlock> <StatementBlock>;
    <RuleBody> ::= <AssertBlock>;

<AssertBlock> ::= RESERVED;

<ParamList> ::= <Param><MoreParams>;
    <MoreParams> ::= COMMA <Param><ParamList>;
```

```
<MoreParams> ::= <>;

<Param> ::= <Tag> <Ident> AS <StdType>;

<Tag> ::= BYREF | OUT;
<Tag> ::= BYVAL | IN;

<FuncReturnType> ::= <StdType>;

////////////////////////////////////////////////////////////////
//
//   Variable/constant/type declarations
//

<VarDeclBlock> ::= <VarDecl> <Terminator> <VarDeclBlock>;
<VarDeclBlock> ::= <>;

<VarDecl> ::= DIM <VarDeclSequence> <Terminator>;

<VarDeclSequence> ::= <VarSimpleDecl> <VarDeclSequence2>;
<VarDeclSequence2> ::= COMMA <VarSimpleDecl><VarDeclSequence2>;
<VarDeclSequence2> ::= <>;

<VarSimpleDecl> ::= <VarList> AS <TypeName> <Initializer>;
<VarSimpleDecl> ::= <ConstDecl>;

<Initializer> ::= EQUALS <Literal>;
<Initializer> ::= <>;

<ConstSource> ::= <ExternalConst> | <Literal>;
<ExternalConst> ::= QUESTION;

<VarList> ::= <Var> <VarList2>;
<VarList2> ::= COMMA <VarList>;
<VarList2> ::= <>;

<Var> ::= <Ident>;

////////////////////////////////////////////////////////////////
//
//   Basic statement types <StatementBlock> ::= <Statement> <StatementBlock>;
<StatementBlock> ::= <>;

<Statement> ::= <WhileStatement>;
<Statement> ::= <ForStatement>;
<Statement> ::= <IfStatement>;
<Statement> ::= <CallOrAssignment>;
<Statement> ::= <WithinBlock>;
<Statement> ::= <DoStatement>;
<Statement> ::= <ReturnStatement>;
<Statement> ::= <ExitStatement>;
<Statement> ::= <StopStatement>;
<Statement> ::= <EraseStatement>;
<Statement> ::= <ParallelBlock>;
```

```
<Statement> ::= <RunStatement>;

////////////////////////////////////////////////////////////

<CallOrAssignment>  ::= <Ident> <CallOrAssign2>;

<CallOrAssign2> ::= <AssignMode>;
<CallOrAssign2> ::= <Call>;

<AssignMode>      ::=  EQUALS <AssignmentExpr> <Terminator>;
<AssignMode>      ::=  <Incrementer> <IntegerExpression>
<Terminator>;
<AssignMode>      ::=  <StringIncrementer> <StringExpression>
<Terminator>;
<Call>            ::=  OPEN_PAREN <TypedExpression> CLOSE_PAREN
<Terminator>;

<AssignmentExpr>  ::=  <TypedExpression>;
<AssignmentExpr>  ::=  new <ObjectConstruct>;

<ObjectConstruct> ::=  <FunctionCall>;

////////////////////////////////////////////////////////////
//
// EXIT statement; used to break out of a looping
// construct.

<ExitStatement> ::= EXIT <Terminator>; // Breaks out of the current
looping construct ////////////////////////////////////////////////////////////
// Various <RunStatement> ::= RUN <FunctionCall> <Terminator>;

////////////////////////////////////////////////////////////

<StopStatement> ::= STOP <StopScope> <Terminator>;   // Stops
execution of rules program
    <StopScope> ::= THIS;
    <StopScope> ::= <>;

////////////////////////////////////////////////////////////

<EraseStatement> ::= ERASE <VarList> <Terminator>; // Zeros the
specified variables; works with arrays, simple types, etc.

////////////////////////////////////////////////////////////
//
// RETURN expr

<ReturnStatement> ::= RETURN <TypedExpression>; // Must match
current function/rule ////////////////////////////////////////////////////////////
//
// FOR and FOREACH statements
```

```
<ForStatement> ::= FOR <ForRest>;

<ForRest> ::= <Ident> EQUALS <StartExpr> TO <EndExpr> <StepDecl> <Terminator>
                    <StatementBlock>
                 NEXT <Terminator>;

<StartExpr> ::= <IntegerExpression>;
<EndExpr>   ::= <IntegerExpression>;

<StepDecl>    ::= STEP <IntegerExpression>;
<StepDecl>    ::= <>;

<ForRest> ::= EACH <Ident> IN <CollectionExpression> <Terminator>
                    <StatementBlock>
                 NEXT <Terminator>;

<CollectionExpression> ::= <TypedExpression>;

///////////////////////////////////////////////////////
//
// IF statement [ELSEIF]+  [ELSE]   END IF
//

<IfStatement> ::= IF <IfCondition> THEN <Terminator>
                      <StatementBlock>
                      <ElseBlock>
                    END IF <Terminator>;

<ElseBlock> ::= <ElseIfBlock> <ElseStatement>;

<ElseIfBlock> ::= <ElseIfStatement> <ElseIfBlock>;
<ElseIfBlock> ::= <>;

<ElseIfStatement> ::= ELSEIF <IfCondition> THEN <Terminator>
                          <StatementBlock>;

<ElseStatement> ::= ELSE <Terminator>
                       <StatementBlock>;
<ElseStatement> ::= <>;

<IfCondition> ::= <BooleanExpression>;
<IfCondition> ::= TYPEOF <Ident> EQUALS <TypeName>;

///////////////////////////////////////////////////////
//
// WHILE statement

<WhileStatement> ::= WHILE <BooleanExpression> <Terminator>
                        <StatementBlock>
                      END WHILE <Terminator>;

///////////////////////////////////////////////////////
//
// DO Statements
```

```
<DoStatement> ::= DO <DoContinuator>;

<DoContinuator> ::= WHILE <BooleanExpression><Terminator>
                        <StatementBlock>
                    LOOP <Terminator>;

<DoContinuator> ::= UNTIL <BooleanExpression><Terminator>
                        <StatementBlock>
                    LOOP <Terminator>;

<DoContinuator> ::= <Terminator>
                        <StatementBlock>
                    LOOP <DoTerminator><Terminator>;

<DoTerminator> ::= WHILE <BooleanExpression> <Terminator>;
<DoTerminator> ::= UNTIL <BooleanExpression> <Terminator>;
<DoTerminator> ::= <>;    // Allow DO ... LOOP infinite loop ////////////////////////////////////////////////////////////////
//
// WITHIN block <WithinBlock> ::= WITHIN <TimeExpr> <Terminator>
                       <StatementBlock>
                   ELSE <Terminator>
                       <StatementBlock>
                   END WITHIN <Terminator>;

<TimeExpr> ::= <TimeExpression>;   // Where expression type is time'

<TimeExpr> ::= <TimeUnit> OPEN_PAREN <TimeExpression> CLOSE_PAREN;

<TimeUnit> ::= MILLISECONDS;
<TimeUnit> ::= SECONDS;
<TimeUnit> ::= MINUTES;
<TimeUnit> ::= HOURS;
<TimeUnit> ::= DAYS;

////////////////////////////////////////////////////////////////

<ParallelBlock> ::= PARALLEL <Terminator>
                        <ParallelOps>
                    END PARALLEL <Terminator>;

<ParallelOps> ::= <SelectBlock>;
<ParallelOps> ::= <AcceptBlock>;
<ParallelOps> ::= <>;

<SelectBlock> ::= <Select><ParallelOps>;
<AcceptBlock> ::= <Accept><ParallelOps>;

<Select> ::= SELECT <VarList> <OptionalWithin> <Terminator>
                 <StatementBlock>
                 <OptionalElse>
             END Select <Terminator>;
```

```
<Accept> ::= ACCEPT <VarList> <OptionalWithin> <Terminator>
            <StatementBlock>
            <OptionalElse>
         END ACCEPT <Terminator>;

<OptionalWithin> ::= WITHIN <TimeExpr>;
<OptionalWithin> ::= <>;

<OptionalElse> ::= ELSE <Terminator>  // Only legal if a WITHIN
clause was used
                  <StatementBlock>;

///////////////////////////////////////////////////////////
//
//   Expression production types (r-values)

<IntegerExpression> ::= <TypedExpression>;
<BooleanExpression> ::= <TypedExpression>;
<TimeExpression>    ::= <TypedExpression>;
<StringExpression>  ::= <TypedExpression>;

// In the expression productions, the lowest
   // precedence is toward top, higher precedence toward
   // bottom <TypedExpression> ::= <Xor_Expr>;

// Lowest level, XOR

<Xor_Expr> ::= <Or_Expr> <Xor_Rest>;
<Xor_Rest> ::= <Xor> <Or_Expr> <Xor_Rest>;
<Xor_Rest> ::= <>;

// Next level, simple expression or logical OR or ORELSE

<Or_Expr> ::= <And_Exp> <Or_Expr_Rest>;
<Or_Expr_Rest> ::= <Logical_Or> <And_Exp> <Or_Expr_Rest>;
<Or_Expr_Rest> ::= <>;

// Next highest level, logical AND or ANDALSO

<And_Exp> ::= <Not_Exp> <And_Exp_Rest>;
<And_Exp_Rest> ::= <Logical_And> <Not_Exp> <And_Exp_Rest>;
<And_Exp_Rest> ::= <>;

// Next level: Logical not

<Not_Exp> ::= <Not_Operator> <Test_Op_Exp>;
<Not_Operator> ::= <Logical_Not>;
<Not_Operator> ::= <>;

// Next level, test operators =, <>, <, >=, Like, etc.
   // Special-case TypeOf <ident> IS <TypeName>

<Test_Op_Exp> ::= <String_Cat_Exp> <Test_Op_Exp_Rest>;
```

```
        <Test_Op_Exp_Rest> ::= <Test_Op> <String_Cat_Exp>
<Test_Op_Exp_Rest>;
        <Test_Op_Exp_Rest> ::= <>;

// Next level of precedence : string concatenation &

<String_Cat_Exp> ::= <Add_Exp> <String_Cat_Exp_Rest>;
        <String_Cat_Exp_Rest> ::= <String_Cat_Op> <Add_Exp>
<String_Cat_Exp_Rest>;
        <String_Cat_Exp_Rest> ::= <>;

// Next level of precedence + or -

<Add_Exp> ::= <Mult_Exp> <Add_Exp_Rest>;
        <Add_Exp_Rest> ::= <Add_Op> <Mult_Exp> <Add_Exp_Rest>;
        <Add_Exp_Rest> ::= <>;

// Next highest level, * or / or % or \  (integer division)

<Mult_Exp> ::= <Unary_Op_Expr> <Mult_Exp_Rest>;
        <Mult_Exp_rest> ::= <Mult_Op> <Unary_Op_Expr> <Mult_Exp_Rest>;
        <Mult_Exp_rest> ::= <>;

// Next highest level, optional unary negation

<Unary_op_Expr> ::= <Opt_Unary_Op><Selector_Expr>;

<Opt_Unary_op> ::= <Unary_Op>;
        <Opt_Unary_op> ::= <>;

// Identifier, literal, or identifier + param_list (function
call)

<Selector_Expr> ::= OPEN_PAREN <TypedExpression> CLOSE_PAREN;
        <Selector_Expr> ::= <Literal>;
        <Selector_Expr> ::= <Ident> <Ident_Context>;
        <Selector_Expr> ::= <CastExpr>;

<CastExpr> ::= <CastTarget> OPEN_PAREN <TypedExpression>
CLOSE_PAREN;
        <CastExpr> ::= <CTypeCast>;

<CastTarget> ::= CBool;
        <CastTarget> ::= CByte;
        <CastTarget> ::= CChar;
        <CastTarget> ::= CDate;
        <CastTarget> ::= CDbl;
        <CastTarget> ::= CSng;
        <CastTarget> ::= CInt;
        <CastTarget> ::= CLng;
        <CastTarget> ::= CObj;
        <CastTarget> ::= CStr;

<CTypeCast> ::= CType OPEN_PAREN <TypedExpression> COMMA <TypeName>
CLOSE_PAREN;

// Determine if the identifier is just an identifier dereference
```

```
// or is a function call
//

<Ident_Context> ::= <Function_Call_Params>;
<Ident_Context> ::= <Dereferenced_Ident>;
<Dereferenced_Ident> ::= <>;

////////////////////////////////////////////////////
//
// Function call parameter list
//
// If we get here, the previous ident becomes a function ident <FunctionCall> ::= <Ident> <Function_Call_Params>;

<Function_Call_Params> ::= OPEN_PAREN <Param_List> CLOSE_PAREN;

<Param_List> ::= <Actual_Param> <Param_List2>;
<Param_List> ::= <>;

<Param_List2> ::= COMMA <Actual_Param> <Param_List2>;
<Param_List2> ::= <>;
<Actual_Param> ::= <TypedExpression>;
<Actual_Param> ::= <RendezvousPartialBinding>;

<RendezvousPartialBinding> ::= UNDERSCORE;

////////////////////////////////////////////////////////////////////
//
// All tokens recognized by the scanner appear below here.
//

<Ident> ::= <Legal_Ident> <Optional_Qual_Name>;
<Optional_Qual_Name> ::= DOT <Ident>;
<Optional_Qual_Name> ::= <>;

<Incrementer> ::= PLUS_EQUALS;   // +=
<Incrementer> ::= MINUS_EQUALS;  // -=
<Incrementer> ::= STAR_EQUALS;   // *=
<Incrementer> ::= DIV_EQUALS;    // /=
<Incrementer> ::= IDIV_EQUALS;   // \=

<StringIncrementer> ::= AMP_EQUALS;  // &=

<Legal_Ident> ::=   IDENTIFIER;        // VB identifier

<Literal> ::= <NumericLiteral> | <StringLiteral> | <UriLiteral> | <BooleanLiteral> | <MiscLiteral>;

<NumericLiteral> ::= INTEGER_CONST;    // 123 -123 etc.
<NumericLiteral> ::= REAL_CONST;       // 1.2 1.2E+10 1.2E-10 etc.
<NumericLiteral> ::= HEX_CONST;        // 0x123 or &H123
<NumericLiteral> ::= BINARY_CONST;     // 01001B <StringLiteral> ::= STRING_CONST;      // "quotedstring" or 'quotedstring'
<UriLiteral> ::= URI_CONST;            // uri(" ") or `uri` or #uri
```

```
<BooleanLiteral> ::= TRUE;              // TRUE keyword
<BooleanLiteral> ::= FALSE;             // FALSE keyword
<MiscLiteral> ::= DATETIME;             // VB/RDL conventions
<MiscLiteral> ::= NOTHING;
<MiscLiteral> ::= NULL;
<MiscLiteral> ::= CHAR_LITERAL;         // "x"c  <-- note 'c' suffix <Test_Op> ::= GT;      // >
<Test_Op> ::= LT;      // <
<Test_Op> ::= GE;      // >=
<Test_Op> ::= LE;      // <=
<Test_Op> ::= EQ;      // =
<Test_Op> ::= NE;      // != or <>
<Test_Op> ::= LIKE;    // Like keyword
<Test_Op> ::= IS;
<Test_Op> ::= TimeOf;  // TimeOf keyword (RDL)

<Xor> ::= XOR;

<String_Cat_Op> ::= AMPERSAND;   // &

<Mult_Op> ::= MULT;      // *
<Mult_Op> ::= MODULO;    // MOD keyword
<Mult_Op> ::= SLASH;     // / for division
<Mult_Op> ::= BACKSLASH; // \ for integer division <Logical_And> ::= AND;     // 'AND'
<Logical_And> ::= ANDALSO; // Short-circuit and
<Logical_Or>  ::= OR;      // 'OR'
<Logical_Or>  ::= ORELSE;  // Short-circuit version
<Logical_Not> ::= NOT;     // NOT <Add_Op> ::= PLUS;      // +
<Add_Op> ::= MINUS;

<Unary_Op> ::= MINUS;
<Unary_Op> ::= PLUS;

<StdType> ::= CHAR;
<StdType> ::= INTEGER;
<StdType> ::= INT32;
<StdType> ::= UINT32;
<StdType> ::= INT64;
<StdType> ::= UINT64;
<StdType> ::= BYTE;
<StdType> ::= SHORT;
<StdType> ::= LONG;
<StdType> ::= UINT16;
<StdType> ::= INT16;
<StdType> ::= SINGLE;
<StdType> ::= DOUBLE;
<StdType> ::= STRING;
<StdType> ::= FLOAT;
<StdType> ::= OBJECT;
<StdType> ::= XML;
<StdType> ::= DATE;
<StdType> ::= INTERVAL;
```

```
<StdType> ::= COLLECTION;

<Terminator>    ::= NEWLINE;

<AccessModifier> ::= PUBLIC | PRIVATE;
<AccessModifier> ::= <>;

// END
```

Figure 3:
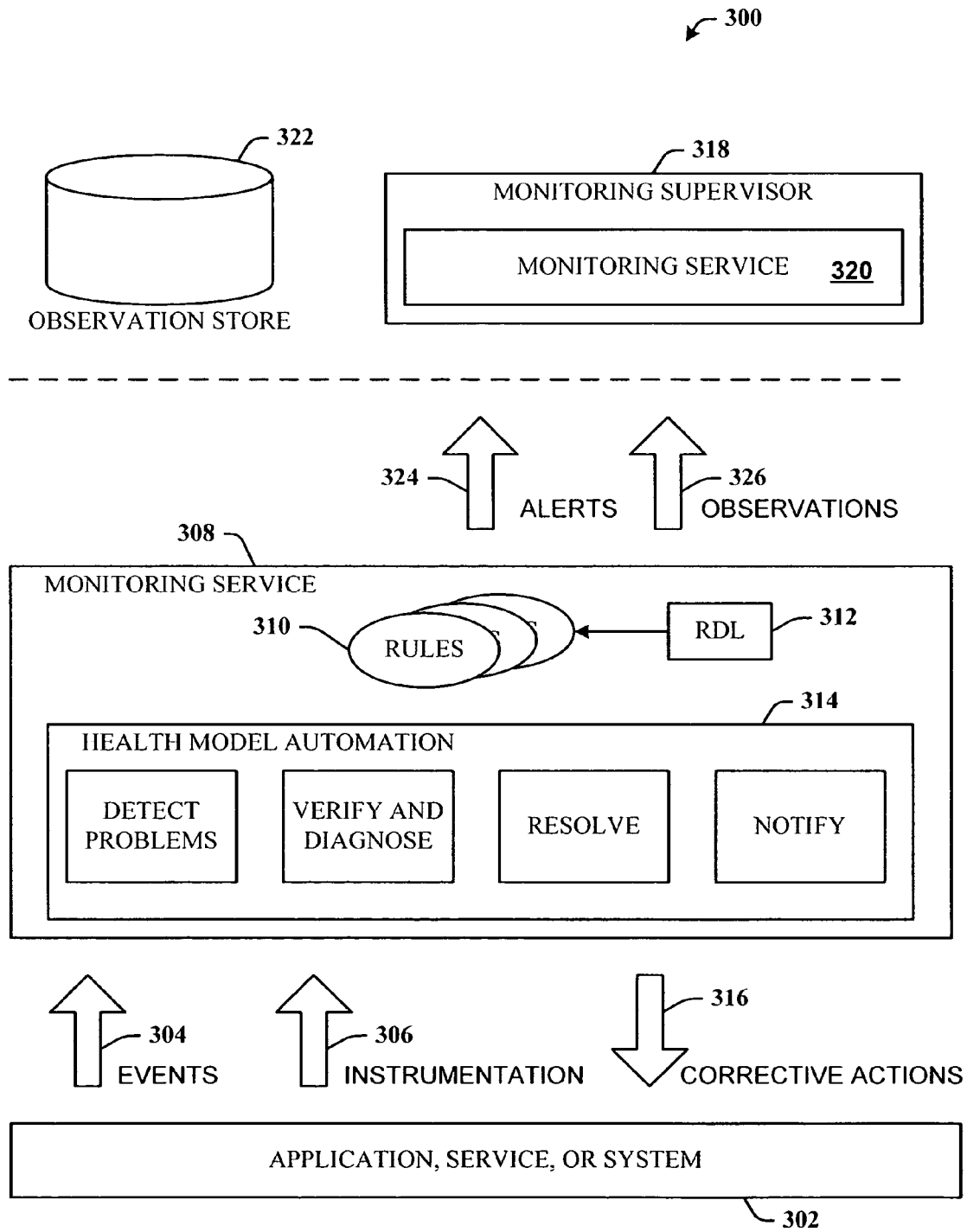
FIG. 3 illustrates a general block diagram of a monitoring logical architecture that processes rules in accordance with the RDL of the present invention.

Referring now to FIG. 3 there is illustrated a general block diagram of a monitoring logical architecture 300 that processes rules in accordance with the RDL of the present invention. There is an application, service, or system 302 that is described at least in the form of events 304, instrumentation 306, both of which descriptions are passed to a runtime monitoring service 308. The runtime service 308 is programmed using rules 310, which rules 310 are generated according to the RDL 312. The rules 310 facilitate collecting data, analyzing the observations, and launching actions.

The application, service, or system 302 is described, at least in one way, in the form of a health model 314 that describes health information that is utilized to determine if the application 302 is operationally and/or functionally healthy. The health model 314 is the framework for developers and operations teams to describe possible failure states of the application 302, the mechanism to detect or prevent the problem, how to verify the failure and determine root cause, and how to recover. The health model 314 is automated using monitoring rules 310, and executed by the runtime monitoring service 308. The health model 314 is used by the runtime monitoring service 308 to automatically detect problems, verify and diagnose the problems, resolve problems, and notify the user or administrator when manual actions are required. The runtime service 308 also automates common administrative tasks for complex trigger conditions. Corrective actions 316 can then be passed back from the runtime service 308 to the application 302.

The monitoring rules 310 create the configuration data for the monitoring service 308. The RDL 312 is a method of writing the monitoring rules 310 that facilitates the expression of correlations and complex trigger conditions.

A monitoring supervisor 318 resides on a server machine and enables central configuration and targeting of monitoring rules, performs correlation across machines, and logs observations. The server-based monitoring supervisor 318 includes a monitoring service 320 to facilitate interfacing with a number of the runtime service 308 disposed on a network. An observation store 322 provides for aggregation of events, performance counters, instrumentation, and alerts into a central database.

Forwarding is used by the runtime service 308 to transport alerts 324 and observations 326 from managed nodes to the monitoring supervisor 318. The alerts 324 notify the user or administrator that there is a problem that requires their attention.

Note that the monitoring service can be used on a standalone installation and allows for loading and running RDL rule files submitted through a command line tool.

The monitoring supervisor component 318 is designed for central monitoring of machines, and uses of a SQL Server database for storing operational data.

The RDL 312 is designed to enable the creation of custom rules to monitor the availability of software and hardware components. RDL 312 empowers administrators and developers with an effective tool to analyze, correlate and reason over instrumentation data in order to determine the root cause of a failure and take appropriate corrective action. The automation of this process is the main goal of RDL.

RDL rules 310 are loaded into runtime monitoring service 308 (also described hereinbelow with respect to a model-based management system) and executed as compiled code leading to great performance. The runtime monitoring service 308 is designed to execute thousands of RDL rules 310 concurrently with the use of a small number of physical threads. A rule being executed by the monitoring service is referred to as a task.

Figure 4:
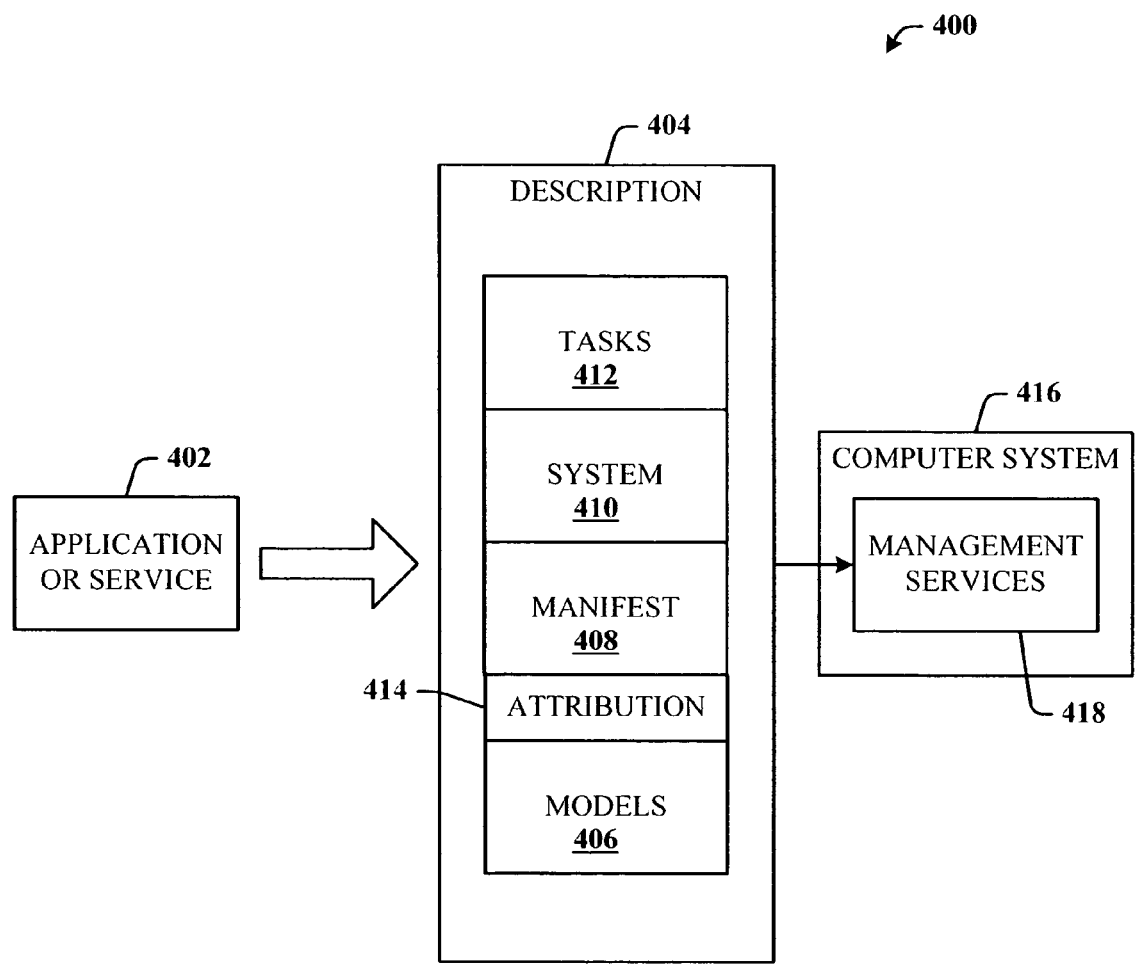
FIG. 4 illustrates architecture that facilitates model-based management of applications or services utilizing the RDL of the present invention.

Referring now to FIG. 4, there is illustrated a model-based management architecture 400 that utilizes the RDL language of the present invention. The model-based management approach allows a developer to describe an application or service 402 in terms of its constituent components and desired states in terms of functionality, configuration, security, and performance. Thus, an application or service description 404 facilitates describing the application 402 in terms of one or more components, including at least a tasks component 406, a system component 408, a manifest component 410, a model component 412, and an attribution component 414. A computer system 416 uses the application description 404 at installation of the application 402 to configure management services 418 associated with the computer operating system. The management services then help ensure uptime of the application or service 402 through automatic management actions such as configuration management, problem detection, diagnosis, and recovery. The model also describes common tasks that the administrator may perform. The model-based management architecture 400 facilitates a lower total cost of ownership, and is used across the application lifecycle from development, to deployment, operations, and business analysis.

Figure 5:
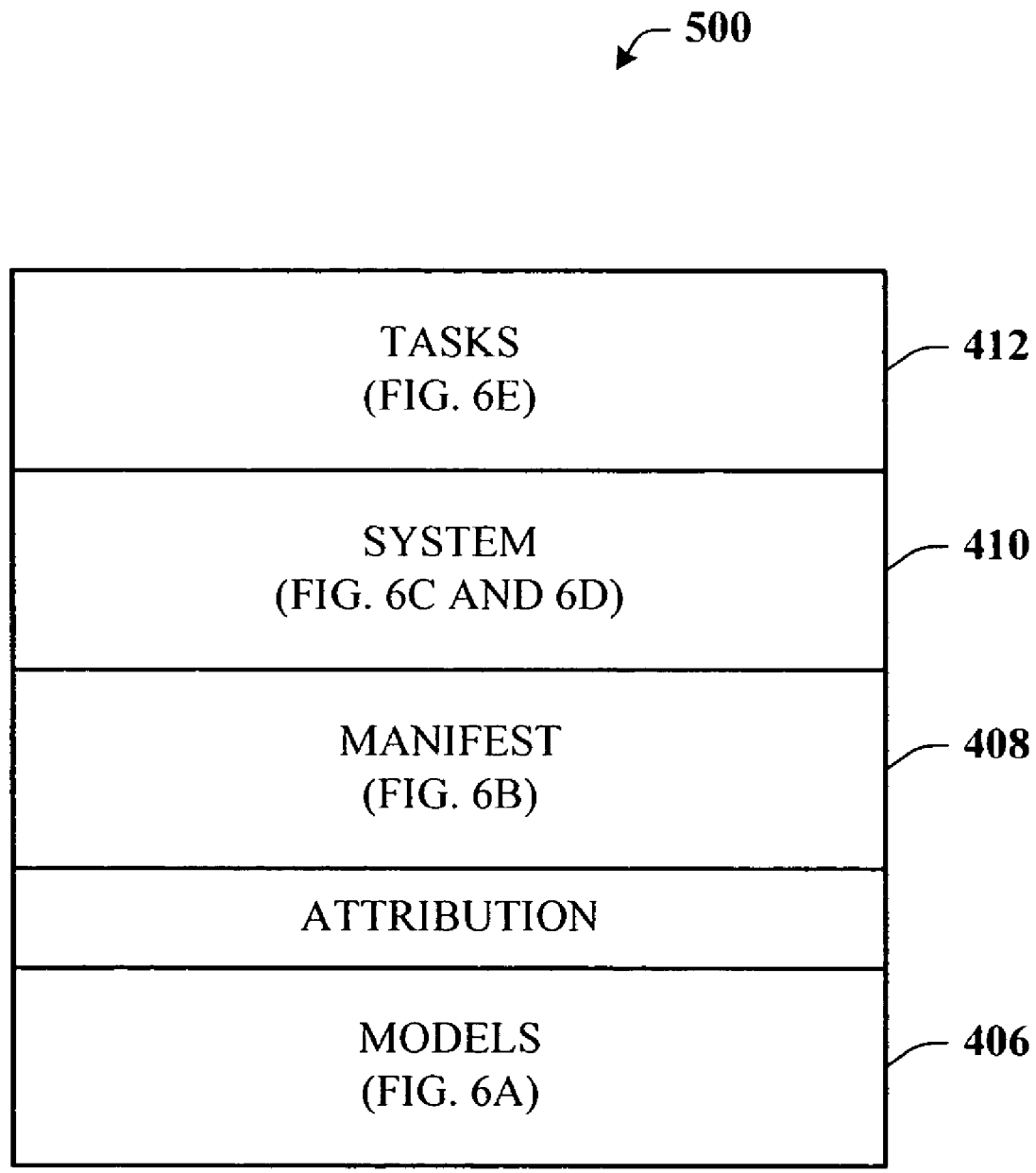
FIG. 5 illustrates a drawing map related to describing principal components of the model-based management architecture.

Referring now to FIG. 5, there is illustrated a drawing map 500 related to describing principal components of the model-based management architecture 400. The architecture includes the models component 406 that is described in relation to FIG. 6A, the manifest component 408 that is described in relation to FIG. 6B, the system component 410 that is described in relation to FIG. 6C and FIG. 6D, and the tasks component 412 that is described in relation to FIG. 6E. Attribution has already been described, and will be addressed throughout the specification.

Figure 6B:
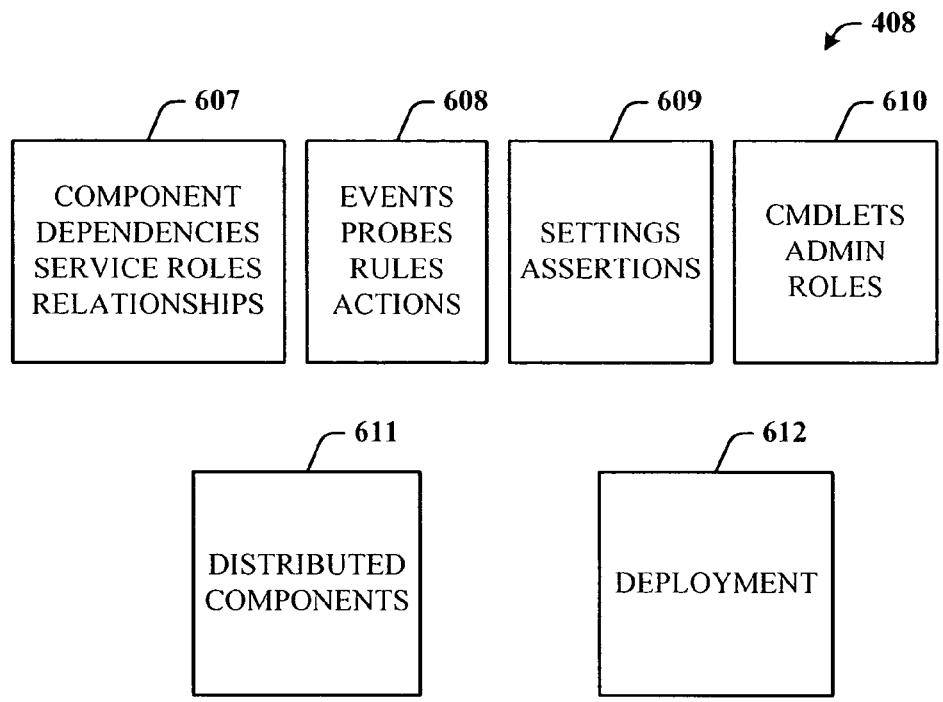
FIG. 6B illustrates blocks associated with the manifest component of the model-based management architecture.
Figure 6B:
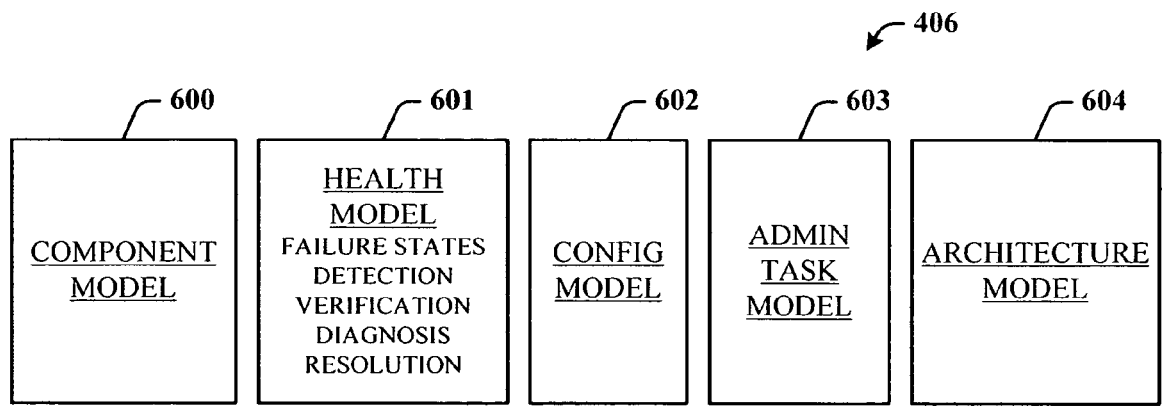
Figure 6A:
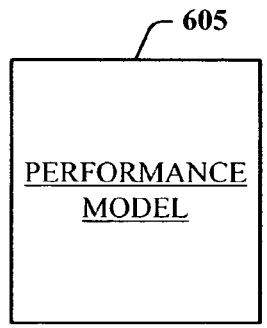
FIG. 6A illustrates blocks associated with the models component of the model-based management architecture.

Referring now to FIG. 6A, there are illustrated blocks associated with the models component 406 of the model-based management architecture. Models are developed for the components making up an application, health states and recovery, configuration settings, and administrative tasks.

In support thereof, there is a component model subcomponent 600 for modeling any and all components of the system (and relationships, dependencies and service roles associated therewith). The component model 600 describes the files, configuration, different ways the application can be installed, and more.

A health model subcomponent 601 can be developed to describe the various failure states, and the way that the application or service could fail. The health model 601 describes the steps that would need to be taken to automate the health features. The health model 601 represents at least the failure states, detection the states, verification, diagnosis, and resolution of the system states. The health states can be described in terms of what criteria must be met to be considered completely healthy, to completely fail and any intermediate states, e.g., degraded performance, partially working, some of the customer functionality is working, and is the application or service delivering the expected level of service. Health also considers that functionality could be fine, but performance is substandard indicating that the application or service is not healthy.

A configuration model subcomponent 602 is associated with modeling the system configuration. The configuration model 602 is used to describe the application settings, user controls, default values, various restrictions, etc. An administrative task model subcomponent 603 is associated with modeling administrative tasks, and includes the actions a user can take upon a system, such as start, stop, add user, add database, and corrective actions that can be called from the health model 601. The model 602 enumerates all that can be done with the application or service. An architecture model 604 is used to describe distributed environments and associated deployment, normally associated with, for example, a large network of clients having the same or similar hardware and software settings and configuration, and distributed databases. Thus, a local application may be dependent on a remote disk array. At deployment, the disk array needs to be instanced at the deployment level with a manifest and using URIs. Since the URI is machine independent, distributed systems can also obtain the benefits of the model-based management system. A performance model 605 can be developed to describe the way in which the developer wishes to use metrics for monitoring performance of the application or service. This is closely related to health of the system. A security model 606 can be generated that describes the types of security associated with the application or service.

Note that the number of models provided herein is not exhaustive, since the developer can provide many different models for managing various aspects of the application or service.

The subject model-based system can employ various artificial intelligence based schemes for carrying out various aspects thereof. For example, with respect to models, a process for determining what models can be utilized for a given instance or implementation can be facilitated via an automatic classification system and process. Moreover, such classifiers can be used to build operational profiles of the system that start to detect system patterns, and learn what is a good state, a bad state and, successful and unsuccessful transactions. This information can then be fed back into the corresponding model and used as an updated model for a follow-on system. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the model-based system can employ classifiers that are explicitly trained (e.g., via a generic training data) as well as implicitly trained (e.g., via observing user behavior, receiving extrinsic information) so that the classifier(s) is used to automatically determine according to a predetermined criteria, for example, what initial settings to use for a given implementation, and then adjusting the settings over time as the system matures and experiences various loading conditions with respect to data, number of installed applications, and the number of nodes with which to interact. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$. In the case of management systems, for example, attributes are system parameters of desired states, and the classes are categories or areas of interest (e.g., all drives, all native process). Classifiers can also be employed to capture and analyze transaction logs, look for patterns, and diagnose a system by looking for successful and unsuccessful patterns.

Configuration health involves, for example, changing a queue size from five to ten, and determining what impact the change can have on the application, service, or system. The same applies for security and performance, where a classifier can be employed to monitor performance counters and make system changes accordingly to optimize performance. Security can also be monitored and analyzed for patterns, the impact of which can be used to suggest or alter security polices. Thus, it is to be appreciated that health is a broad concept that can be applied to many areas of the system. In a system-wide scope, performance can be good, but security could be poor. Thus, a holistic view that crosses many disciplines of the system is advantageous.

The desired states of the administrator can be expressed in the code, which is surfaced in the manifest and passed for monitoring by the monitoring service. The system can, based upon instructions in the manifest, monitor the application or service and alert the administrator when the application or service does not meet the performance, and based on the instructions, take corrective actions. For example, where a test setting for e-mail is not maintained, but falls below a threshold for a period of time, another machine can be added until the load subsides, and the network traffic can also be used as a trigger increasing the number of resources to handle the given load. A goal is automate as much a possible so that the administrator is involved only when manual action is required.

The model-based management system is composable. It is component based, with a component comprising most anything. Thus, the system can be reduced to its lowest manageable piece and composed back up. In a database, for example, there is the application, with instances, the database, tables, and stored procedures, and can be reduced as low as a single file. Consider a 401k application. The 401k application can depend on a database, a web sever, and the customer's own business logic, down to a database that depends on the operating system and associated. It is desirable to manage and report at the various levels. Applications are described through relationships between components. These relationships can express how an individual application is assembled (e.g., SQL server contains a service, instances, and databases), platform requirements (e.g., operating system and other applications), and communication to other components (the web server connecting to the SQL server). A single administrator may care about a database and a single machine, whereas a finance administrator may care about the 401k application, and the CIO cares about all of the applications and machines. The models, reporting, and desires states should process everything such that individual metrics can be referenced to determine if the system is doing what is expected.

All models are tied into a URI namespace, providing a standard way of navigating the system, enumerating all components installed, and asking the component what it provides, what is considered healthy, what events does it have, what error events occurred in the last day or hours, what configuration settings are included, what changes occurred in the last hour, etc.

Referring now to FIG. 6B, there are illustrated blocks associated with the manifest component 408 of the model-based management architecture. The manifest that ships with the application contains information from the models and source code attribution in a machine-readable form for use by management system services. Administrative tasks for an application are defined within the manifest. There can be a number of manifests generated that correspond to the models, including the following; a first manifest subcomponent 607 associated with component dependencies, relationships between the components, and service roles; a second manifest subcomponent 608 associated with events, probes, rules, and actions; a third manifest subcomponent 609 associated with settings and assertions; a fourth manifest subcomponent 610 associated with commands (i.e., cmdlets) and administrative roles; a fifth manifest subcomponent 611 associated with distributed environments; and a sixth manifest subcomponent 612 associated with deployment.

The manifest is the "bridge" between developer and, the operations team and the administrator, and is created automatically with a tool that sweeps the models for the attributed code. The component manifest 607 is used by a setup engine to determine how to install the application or service. It describes the logical components, files, where the files should be installed, and configuration settings (or any settings). Dependencies are what need to be defined before installation, and include various roles, so that the application can be installed in different modes, with varying degrees of security, and different operational profiles. The component manifest 607 makes it easier for the user and/or the system to know what to do manually and automatically. Manifest granularity can get down to one manifest per component.

Conventionally, many more files are installed than what are actually needed. The manifest allows installing only those files that are needed. This improves at least performance and security. Software dependencies are defined in the manifest 607. At the application level, the dependencies can be specific to a single machine and define component relationships and the hardware resources. A computer can be described by a manifest, for example, the application should be deployed on a dual-processor machine of a specific manufacturer, or interface to a 4-processor machine. This manifest 607 describes the processor, memory, drives, etc., to the level of hardware granularity needed for the implementation. Thus, management can be more proactive then reactive, as in conventional systems. A hard disk failure can be determined to be caused by thermal failure, for example, where the system temperature is monitored over time, and the power supply rail voltages are monitored, but found to be sufficient.

The health model 601 is used to spawn the health manifest 608. The health manifest 608 is populated from the health model 601 using attribution and other tools. Events are not called out in the model 601, but in a resource file. A tool sweeps the resource files and attributed source code, and populates the health manifest 608. Failure states can be detected by watching for a predefined sequence of events or monitoring performance counter thresholds. Instructions can be provided to the system as to how to address such failure states. The health model is transformed into rules. The health manifest 608 includes ruletype event sequences with parameters such as event1, event2, time3, etc.

The configuration model 602 describes what settings are included and is transformed into the settings and assertions manifest 609 that provides instruction schema for the system to create the settings when the component is installed.

The administrative task model 603 is transformed into actions via the cmdlets and administration roles manifest 610. For example, if a data backup is required, the cmdlet is the actual code or URI used to facilitate the backup task. Where numerous administration tasks need to be performed, the manifest 610 provides the URI path to the those commands and perhaps to the code. The cmdlet can be processed through assertion on the code or may require external code. The administration role is another abstraction supporting, for example, multiple classes of users that manage this application or service, and the level of control they each can exercise. This associates with role-based access. Metadata is required that describes the roles of the various users and their allowed capabilities. Roles cross all aspects of the system—who is allowed to install, who can change monitoring, who can look at health, who can resolve alerts, who can take these various actions, etc.

The task model 603 defines what the developer thinks the administrator should do, as expressed in the manifest 610, and customized by the operations teams for their environment. These customizations can be done at the class level and instance level. Changes can be made in the manifest at the class level, at the instance level, and changes can be made directly at runtime. A very powerful feature of the disclosed model-based management architecture is that capabilities can first be described at the class level, whereas at runtime, access is to the instance space.

The architecture model 604 surfaces the distributed components manifest 611 and the deployment manifest 612. Network connections between machines, hardware requirements, are covered here, for example. The deployment manifest 612 supports at least applications comprising web servers, middle tier servers, and database servers, and includes frontend/backend applications, network connectivity between the two applications, and describes the relationships between individual nodes. Deployment time creates instances of those described in the overall architecture model 604.

The performance and security models (605 and 606) each support corresponding manifests (not shown) that describe those related functions and operations.

Returning to the employment of machine-based learning, a classifier can be used to select and dynamically generate manifests of selected portions of the model code based on requirements during, for example, first deployment. Default models can be automatically generated using more attribution or less attribution. Over time, as system operational information becomes available, this information can be analyzed such that the level of granularity of the manifest can be adjusted to, for example, more closely monitor the system in specific areas based on the latest data trends and logs. The updated manifest is then regenerated and employed as needed to more closely monitor the application or service.

If a manifest describes the default installation or recommended best practices from the manufacturer, an administrator may want to change things. For example, with respect to health rules the administrator may want to change a threshold from thirty to forty, or install components, or override a security policy. This can be done by creating a customized version of the manifest to override the manifest bundled by the manufacturer. A different version can be detected during installation, allowing a user the option to select the default manifest or the custom manifest. Alternatively, there can be a separate file the system reads that lists the overrides, which are then displayed for selection by the user to be applied to the default manifest or during installation such that the default settings are overridden.

With respect to the distributed applications, the administrator can more generally stipulate that he or she wants three of these, four of that, and six of those, all wired in this configuration. The administrator may customize the deployment manifest 612 accordingly for the given environment.

Figure 6C:
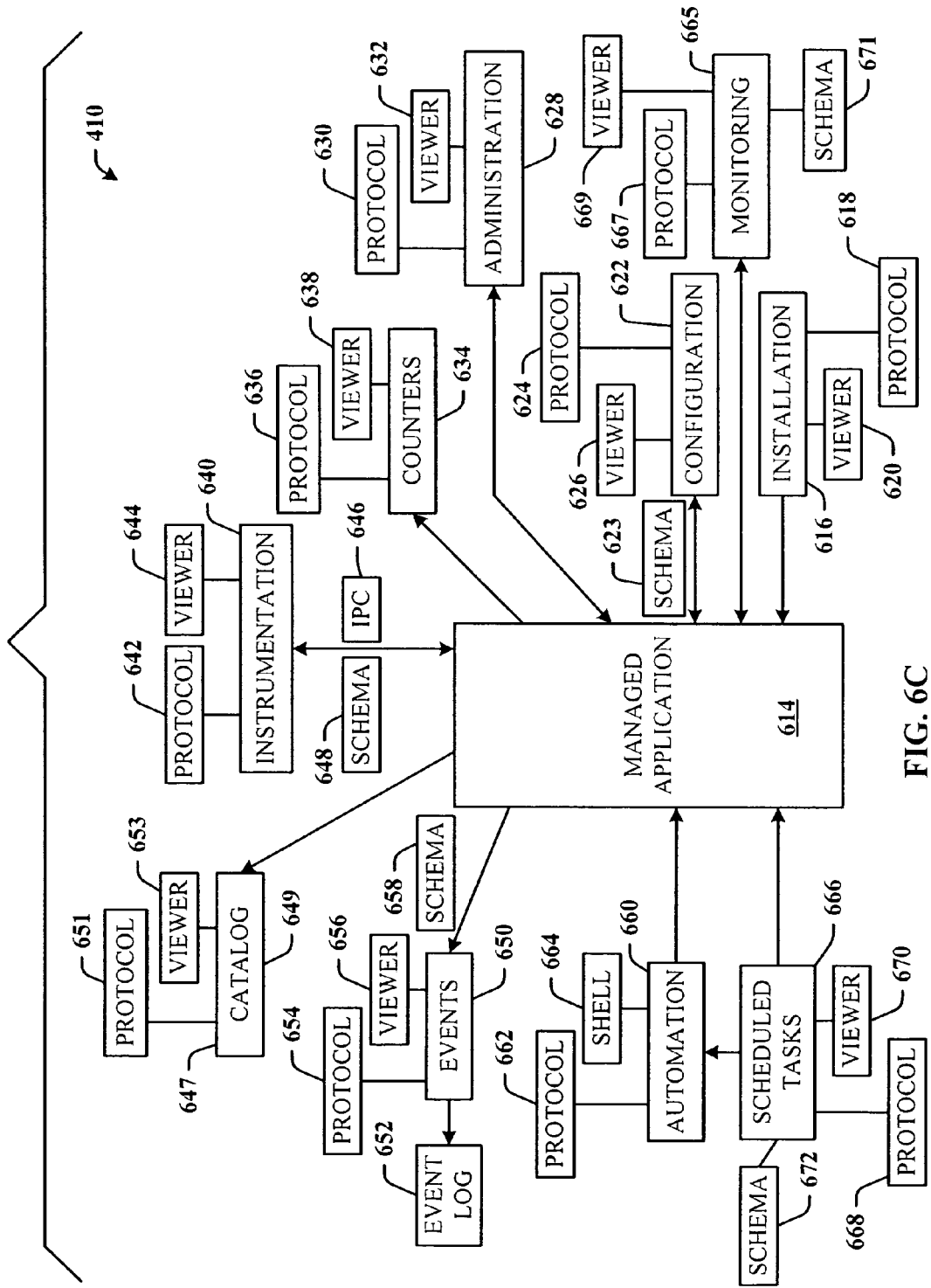
FIG. 6C illustrates a block diagram of core system APIs of the system component utilized for managing an application or service in accordance with the model-based management architecture.

Referring now to FIG. 6C, there is illustrated a block diagram of core system APIs of the system component 410 utilized for managing an application or service 614 in accordance with the model-based management architecture. The system component 410 includes the application or service 614 that is to be managed. The system 410 includes a number of APIs in cooperative communication for facilitating the model-based management. The system 410 is comprised of multiple services that are configured by information within an application manifest (described with respect to FIG. 6B).

The system 410 consists of the services necessary to ensure availability of an application and uses the desired states expressed in the manifest component 408 and modified by the administrator to perform the following: installation to verify dependencies and install only the necessary files, settings, and security; event subscriptions, to subscribe to events and to forward as specified; polled instrumentation to periodically collect instrumentation and counters; and, synthetic transactions or simulating user transactions. One of the best ways to determine if an application is available and performing as expected (the desired state) is for the monitoring system to use the application as if it were a user. This is active monitoring. A potential second way is active monitoring of real user transactions, and reporting aggregate data up to the system for analysis. These steps close the loop and show that internal application data is not sufficient. Model-based management also works outside the application.

The system 410 uses the desired states expressed in the manifest component 408 to also perform task scheduling for automatic task management; role-based access to restrict access to program functions; monitoring to detect problems, diagnose root causes, take corrective actions, and notify the system administrator when intervention is necessary; and, central configuration to customize policy for the above and apply to many machines.

There is provided an installation API 616 in communication with the application 614 to facilitate installation of the application, application updates, and patches. The installation API 616 takes the manifest assemblies via the code and instantiates the assemblies, by instructing the system to install this component, this manifest, and this version, on this machine. The installation API 616 has associated therewith a protocol 618 and a viewer 620. The protocol 618 facilitates communicating API-related data with other components of the system 410. The viewer 620 displays data related to the installation API 616. The installation API 616 not only facilitates installation on a single machine, but also for distributed applications or services involving both local and remote systems, as well as for hardware provisioning and abstraction. For a distributed data center environment, it is important to be able to abstract the hardware system generally, and to a finer granularity, to a specific machine abstraction. A protocol, as contemplated herein with respect to an API, is the rules that govern the transmission and receipt of that API-related data. The viewer 620, as understood in this description, is a program that displays data related to the API, here the installation API 616. The API data includes but is not limited to sound files, video files, for example, and other types of data files.

The system 410 includes a configuration API 622 in communication with the application 614 to facilitate configuring the application 614. The configuration API 622 has associated therewith a schema 623, a protocol 624 and a viewer 626. The schema 623 defines the structure and contents of the data passed between the API 622 and the application 614. The protocol 624 facilitates communicating API-related data with other components of the system 410. The viewer 626 displays data related to the configuration API 622.

There is also included an administration API 628 that facilitates many-to-one administration for distributed environments. The API 628 communicates with the managed application 614 and also remote systems (not shown). The API 628 has an associated protocol 630 and a viewer 632.

The system 410 includes a performance counter API 634 in communication with the application 614 to facilitate tracking counter variables that are used in managing the application 614. The counter API 634 has associated therewith a protocol 636 and a viewer 638. The protocol 636 facilitates communicating API-related data with other components of the system 410. The viewer 638 displays data related to the counter API 634. Performance counters are exposed by the application 614 and publishes the counters through the viewer 638.

There is provided an instrumentation API 640 in communication with the application 614 to facilitate configuring instrumentation and the passing of instrumentation data with the application 614. The instrumentation API 640 has associated therewith a protocol 642 and a viewer 644 through which the instrumentation is exposed. The protocol 642 facilitates communicating API-related data with other components of the system 410. The viewer 644 displays data related to the instrumentation API 640. The instrumentation API 640 communicates with the managed application 614 via IPC (InterProcess Communication) 646. IPC is the automatic exchange of data between one program and another, either within the same computer or over a network. One example of an IPC function is performed when a user manually cuts and pastes data from one file to another using a clipboard. The counters are always published via shared memory, while the instrumentation is delivered on demand. The instrumentation API 640 also includes a schema 648 that describes the surface of the instrumentation classes in manner similar to an events schema. There may also be included an instrumentation log (not shown); however, many administrators prefer to utilize an event log.

The system 410 includes a catalog 647 that is the store that keeps track of and caches component and mode information. This mode information comes from the manifests at install and, parts are dynamic and updated at runtime. The catalog 647 includes a catalog API and provides access to events, counters, instrumentation, and configuration data, to name just a few types of the data stored therein. Access to the catalog 647 is facilitated by a protocol 651 and viewer 653. A central configuration database contains a rolled up or aggregate view of the catalog across multiple managed nodes.

The system 410 includes an events API 650 in communication with the application or service 614 to facilitate implementing and tracking events that are used in managing the application 614. The events API 650 interfaces to an event log 652 that serves as a store for all events that occur. The events API 650 has associated therewith a protocol 654 and a viewer 656. The protocol 654 facilitates communicating API-related data with other components of the system 410. The viewer 656 displays data related to the events API 650. Communications with the application 614 is in accordance with an events schema 658 that defines the structure and contents of the data passed therebetween. The events are published as they are described or happen. The schema describes the surface of the event.

The system 410 includes an automation API 660 in communication with the application 614 to facilitate automating procedures that might normally be done interactively with the application 614. The automation API 660 has associated therewith a protocol 662 and a shell 664. The protocol 662 facilitates communicating API-related data with other components of the system 410. The shell 664 provides a user interface to the automation API 660 to facilitate user interaction therewith for entering and displaying data related to the automation processes and user control of the automation processes.

The system 410 further includes a scheduled tasks API 666 in communication with both the application 614 and the automation API 666. The scheduled tasks API 666 facilitates scheduling jobs or programs for at least the automation API 660 and the managed application 614. It maintains a list of jobs to be run and allocates resources accordingly. The scheduled tasks API 666 has associated therewith a protocol 668 and a viewer 670. The protocol 668 facilitates communicating API-related data with other components of the system 410. The viewer 670 displays data related to the scheduled tasks API 666. A task schema 672 defines the structure and contents of the data passed between the tasks API and other components.

Automation and tasks data is received from the task and cmdlets models. These features can be automated through the management shell either locally or remotely. The scheduling system can run these, e.g., a backup at 3 AM.

Figure 6D:
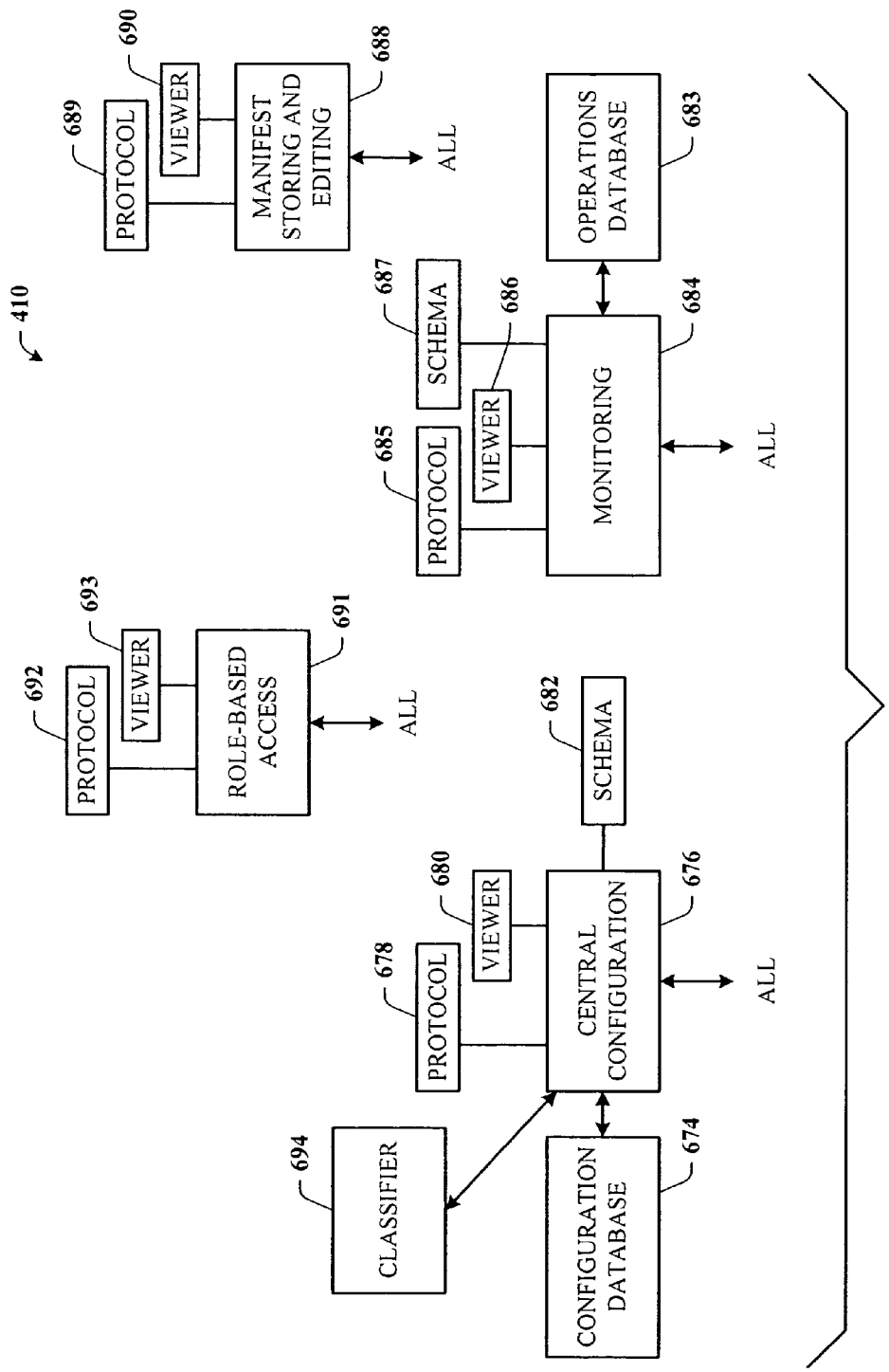
FIG. 6D illustrates a block diagram of management-related APIs of the system component of the model-based management architecture.

It is to be appreciated that components described in FIG. 6C can represent those of a local implementation, while the components of FIG. 6D can represent those associated with a distributed implementation such that analysis occurs across many machines and software systems. Thus, in a distributed implementation, the components of FIG. 6D communicate with at least one of the local systems of FIG. 6C, but typically a plurality of such local implementations in a wired and/or wireless regime. In the local implementation, the system 410 can also include any or all of the components of FIG. 6D, including a local monitoring service API 665. The local monitoring service API 665 also includes a protocol 667, a viewer 669, and schema 671, each of which facilitates functionality similar to such components of other APIs. In a distribute implementation, the local monitoring service 665 then passes monitoring information to the distributed monitoring service, described hereinbelow.

Referring now to FIG. 6D, there is illustrated a block diagram of management-related APIs of the system component 410 of the model-based management architecture. There is provided a configuration database subcomponent 674 to which access and control is provided via a central configuration API 676. The central configuration API 676 interfaces with all subcomponents of the system 410, and has associated therewith a protocol 678 and a viewer 680 for communication and interaction and, a schema component 682 that describes the shape of the configuration settings and attributes, such as assertions and default values. The protocol 678 facilitates communicating API-related data with other components of the system 410.

There is also provided an operations database subcomponent 683 that serves as a repository for operations-related data of the management system, e.g., reporting, current state, and historical data. A monitoring API 684 interfaces to the operations database 683 and all subcomponents of the model-based management system, and further has associated therewith a protocol 685, a viewer 686, and a schema 687. The protocol 685 facilitates communicating API-related data with other components of the system 410. The viewer 686 displays data related to the monitoring API 684. The schema 687 provides the definition for the entire operations database 683 at least with respect to the structure and type of contents that each data element within the structure can contain.

Central configuration can touch all of the APIs, and is used by the administrator to set configuration details, which can include details for the distributed application scenario, such as on what machines should the application be installed. Configuration also includes monitoring configuration. For example, all machines must exhibit no less than 80% CPU utilization for five minutes. Thus, the monitoring system uses the configuration system. Monitoring is how the administrator ensures via the management system that the application is behaving, configured, and installed per the model. It also includes ensuring expected functionality, the desired amount of security, performing properly, and delivery the data as expected for the users. Thus, monitoring crosses all of those domains. The general process is to install, configure, run tasks on demand, consume events, provide instrumentation, configuration, and store data and results. The health manifest provides the working instructions to the monitoring system in the form of rules that are the instructions to the monitoring system. In general, the manifest contains the runtime instructions, and the runtime implements the desired state.

The monitoring service is both a local service, as well as a central or distributed mechanism. For a distributed implementation, health includes that of the local machine as well as the relationships between the local and remote machines. For example, given a cluster of ten machines, as long as six are functioning properly, the system is considered to be healthy. However, if no more than five machines are running, the system health status degrades to a cautionary state. If no more than four machines are running, the system health can be considered in a failure state. Hardware abstraction facilitates bringing one or more backup systems or applications/services online if one or more cluster machines fail or go offline. Thus, a pool of idle or shared resources can be controlled based upon instructions. This feature is particularly useful in a data center environment. Automated actions can be implemented to ensure that the system maintains optimum or at least a minimum functionality.

One aspect of the model-based management architecture allows a developer to author a large number of rules that express criteria that must be met for a system to be considered healthy. The monitoring API 684 includes a rules runtime engine that facilitates implicit concurrent processing of the rules. The rules engine receives input instructions that express the rules as an intermediate form, which rules are expressed using a rules definition language (RDL). The rules engine also receives configuration data from the configuration database 674 that is used to instantiate the rule code. A translator reads the input instructions and transforms them into a parallel execution form. The runtime engine reads the translated instructions and facilitates parallel execution. The rule code is instantiated by loading the configuration data into the runtime engine that specifies which rules to run, as well as the parameters required to run the rule. Rule parameters can be changed at runtime, such as enabling rules that have a heavy system impact only when a problem has been detected. Thus, the rules are dynamic, as well as thresholds, that also can be changed accordingly. The monitoring API 684 also connects to all subcomponents of the system 410.

There is also provided a manifest storing and editing service 688 for use by the administrator. The manifest service 688 has associated therewith a protocol 689 and a viewer 690 to expose these manifest functions to the administrator. The manifest service 688 feeds the manifests to the administrator via the protocol 689 and viewer 690, allowing the administrator to view and change the manifests before installation. The manifest service 688 also facilitates versioning of the manifests according to updates and customizations.

There is also provided a role-based access API 691 that interfaces to all subcomponents of the model-based management system, and further has associated therewith a protocol 692 and a viewer 693. The protocol 692 facilitates communicating API-related data with other components of the system 410. The viewer 693 displays data related to the role-based API 691. This API 691 is illustrated at a level above the monitoring and configuration components to provide overall administration of access to the various components and aspects of the model-based management system. It is not necessary that the role-based access API 691 include the protocol 692 and a viewer 693, since these functions can be facilitated by other components of the system 410.

The system also includes the classifier 694 for machine-based learning and control. As indicated hereinabove, the classifier 694 can be employed in many ways to enhance system performance and health, to name just a few. To facilitate machine-based learning, the classifier 694 interfaces with central configuration service 676 such that all components of the system may be accessed and its data used.

Figure 6E:
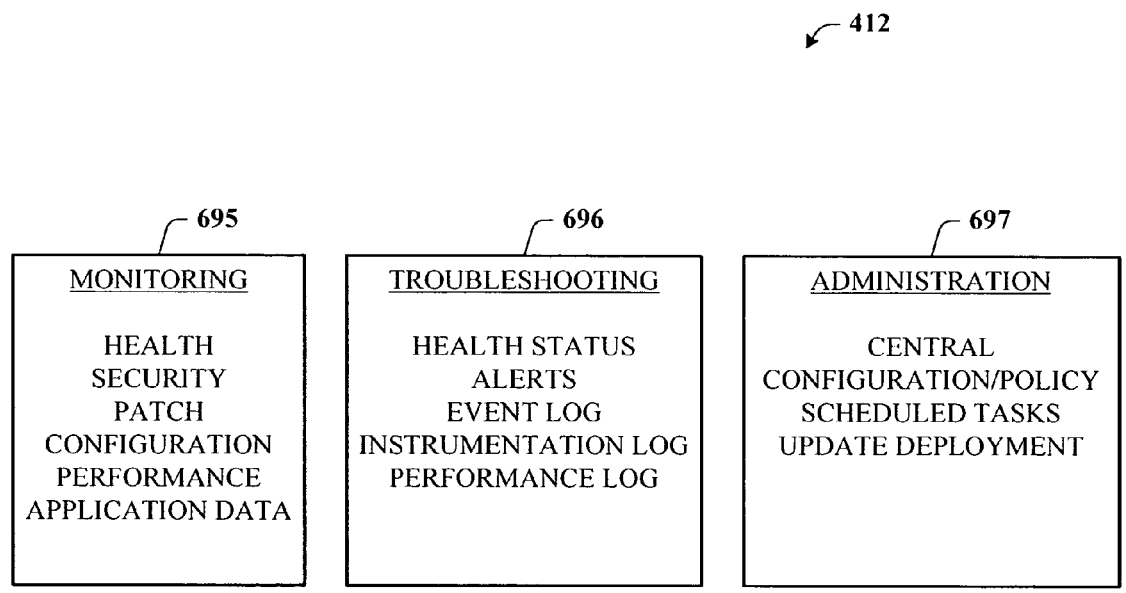
FIG. 6E illustrates principal subcomponents of the tasks component of the model-based management architecture.

Referring now to FIG. 6E, there is illustrated principal subcomponents of the tasks component 412 of the model-based management architecture. The tasks are described through the administration task model. The tasks fall into three subcomponents: a monitoring subcomponent 695, a troubleshooting subcomponent 696, and an administration subcomponent 697.

The tasks for the monitoring subcomponent 695 include overseeing health, security, patches, configuration, performance, and application data. The tasks for the troubleshooting subcomponent 696 include diagnosing a health state, processing alerts, and updating event, instrumentation, and performance logs. The tasks of the administration subcomponent 697 include central configuration/policy, scheduling, and update deployment. Administration includes not only management of a single system by also managing many machines, applications, and systems, policies, backup times, changes, and updates, for example.

URIs are employed in the model-based management architecture to uniquely identify abstract or physical resources or collections of resources. A schema for a resource can be identified by the URI with a placeholder for the resource. The URI with placeholder is called a URI template. The catalog of the system relies on URI templates to describe instrumentation without referring to specific instances. URI templates allow probes to be identified and their characteristics understood without actually retrieving the probe for a particular instance. Protecting the capability to predefine instrumentation separately from instances makes the deployment and authoring of rules easier and the associated operating system manageable.

The model-based management framework employs the RDL to enable defining of rules for the purpose of monitoring the availability of software and hardware. Rules written in RDL are executed by the runtime engine as part of the monitoring service. The purpose of the RDL is to test assertions, enforce constraints using runtime information, make inferences, perform correlation, and communicate results of dynamic tests to other components. The RDL defines the rule type (i.e., class) while a separate XML (eXtensible Markup Language) document is used to create instances of the rule type by specifying the parameter values necessary for its instantiation. There is a schema for describing the sequence of steps the system should take for problem detection, diagnosis, resolution, verification, and alerting. This is what is described in the model, expressed in the manifest, and executed/managed by the monitoring system.

The model-based management framework employs events and update values of performance counters to indicate a health model (or status) of services, and tests or synthetic transaction, as indicated earlier. The health model 601 is a graphical and/or textual representation of how a service or component may fail, which helps an administrator to understand the significance of various events and performance counters of the service, and efficiently decide whether to take any action based on the observed instrumentation data. A developer builds the health model 601 with the corresponding files then generated from the model and source code attribution.

The health model 601 includes a description of the component relationships, in addition to the dependencies. Depending upon the context of a detected problem, the system can walk the relationship tree and attempt to determine root cause based upon the health of other components. This approach is backed by the model and manifest.

Figure 7:
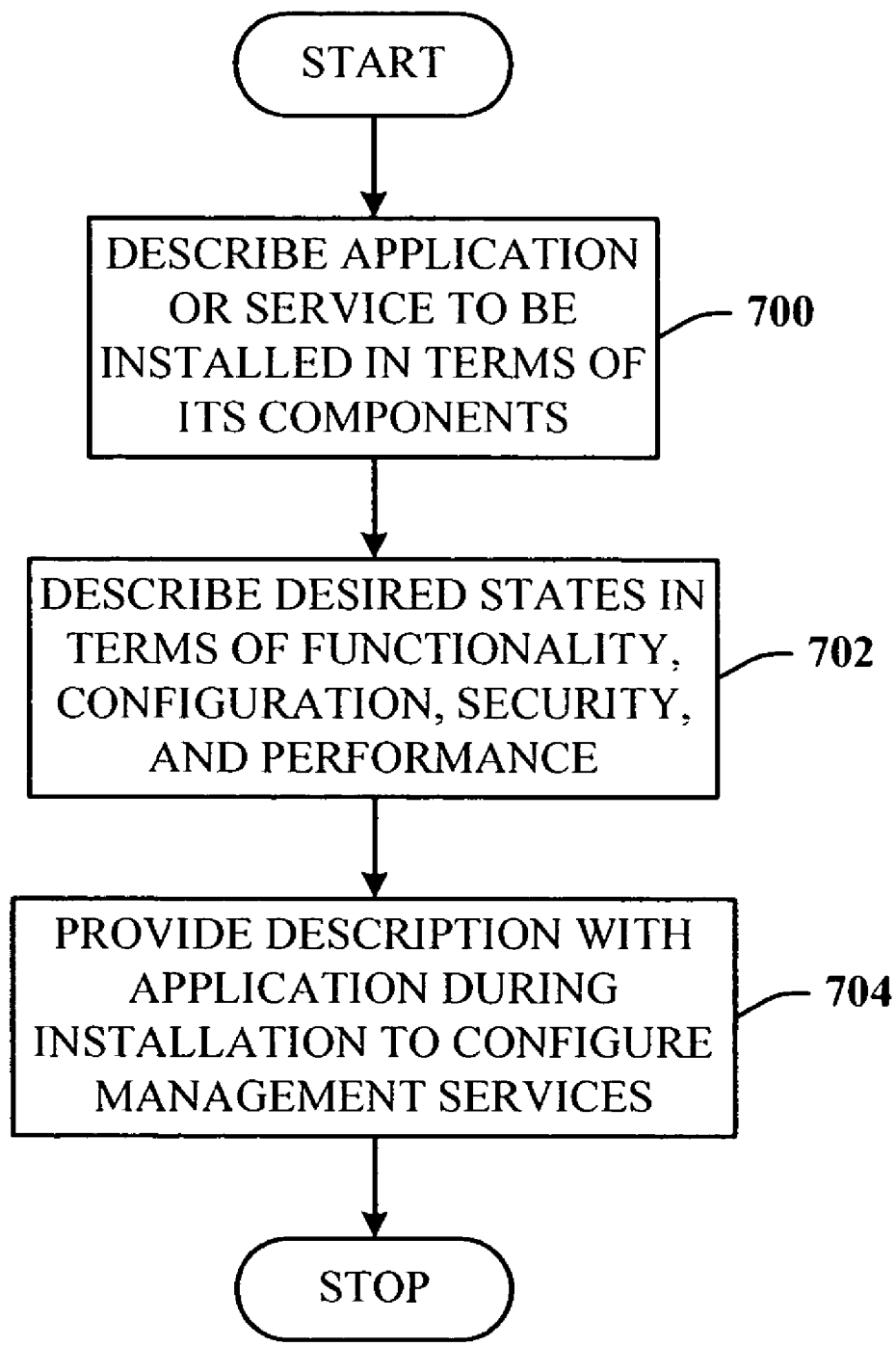
FIG. 7 illustrates a flow chart of a process of model-based management.

Referring now to FIG. 7, there is illustrated a flow chart of a process of model-based management. At 700, the application or service to be installed is described in terms of its components. At 702, the application or service is described in the desired states in terms of functionality, configuration, security, and performance. At 704, the description is provided along with the application or service during installation, such that the description is used by the system to configure management services of the system. The process then reaches a Stop block.

Figure 8:
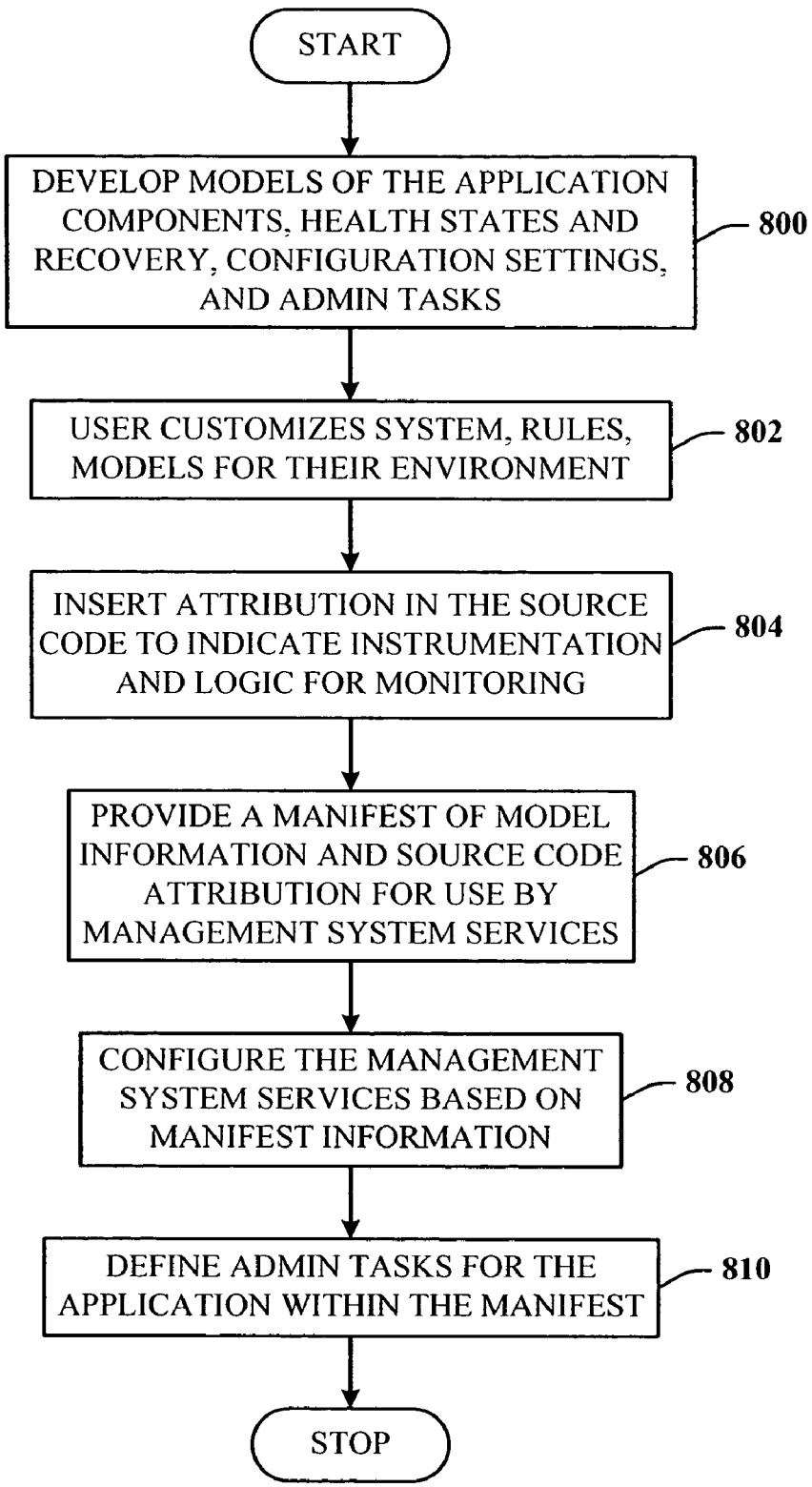
FIG. 8 illustrates a more detailed flow chart of a process of implementing the model-based management.

Referring now to FIG. 8, there is illustrated a more detailed flow chart of a process of implementing the model-based management. At 800, models are developed for the application components, health states and recovery, configuration settings, and admin tasks. At 802, a user customizes the system/rules/models according to the environment. At 804, attribution is inserted into the source code to indicate instrumentation and logic for monitoring. At 806, a manifest is provided of model information and source code attribution for use by the management system services. The manifest is provided for use by the management system services in machine-readable form. At 808, one or more of the management system services are configured based on the manifest information. At 810, administrative tasks are defined for the application within the manifest such as registering cmdlets with the system, setting up schedules, etc. The process then reaches a Stop block.

Figure 9:
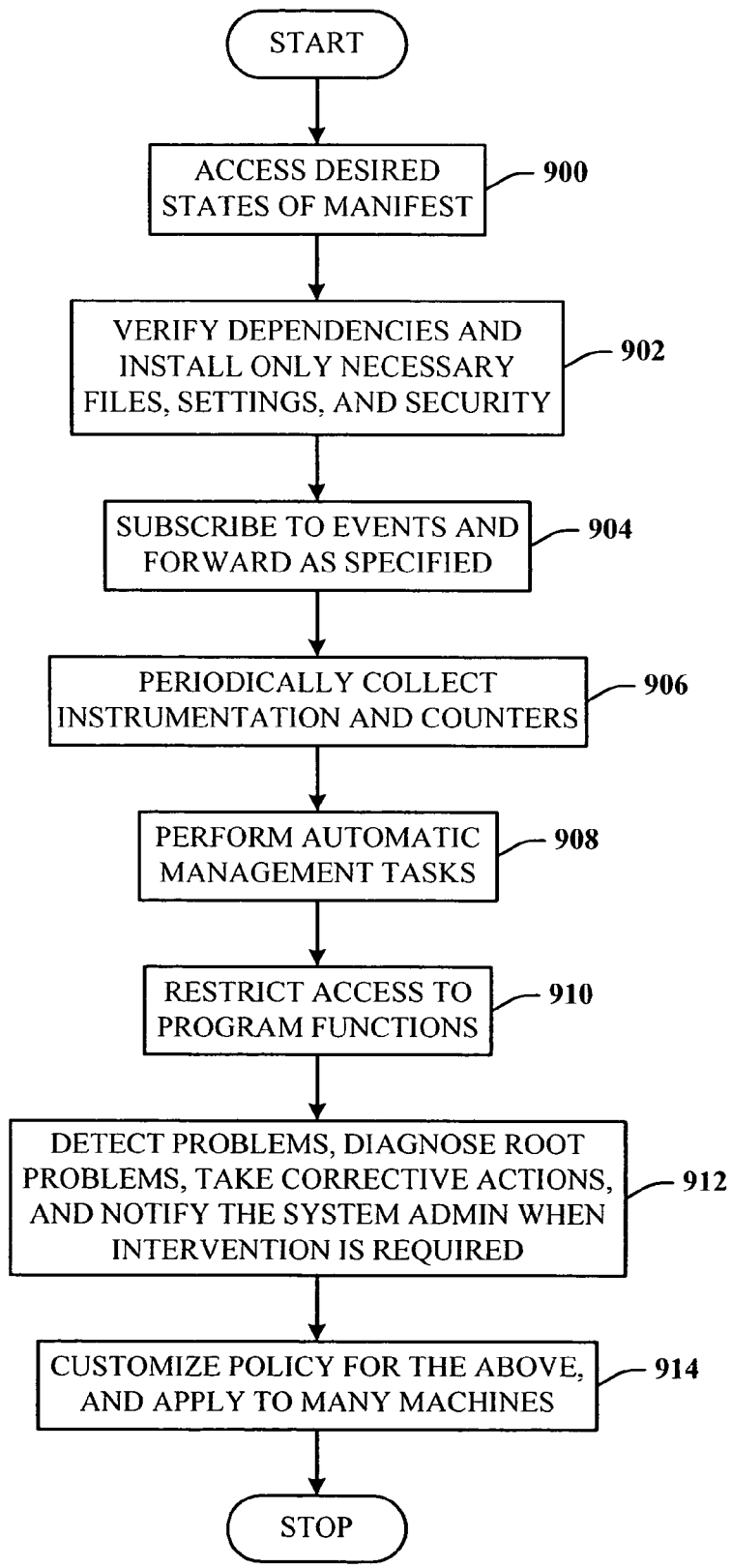
FIG. 9 illustrates a flow chart of a process of implementing desired states of the model-based management.

Referring now to FIG. 9, there is illustrated a flow chart of a process of implementing desired states of the model-based management. At 900, the desired states are accessed from the manifest. At 902, dependencies are verified and only the necessary files, settings, and security features are installed. At 904, events are subscribed to and forwarded, as specified in the manifest. At 906, instrumentation data and counter data is collected periodically, as well as tests and synthetic transactions performed. At 908, automatic management tasks are performed. At 910, access is restricted to program functions. However, this does not need to be included to facilitate model-based management. At 912, problems are detected, root problems diagnosed, corrective actions taken, and the system administrator notified when to intervene. At 914, policies for all of the above are customized for application to many other types of machines and systems. The process then reaches a Stop block.

Figure 10:
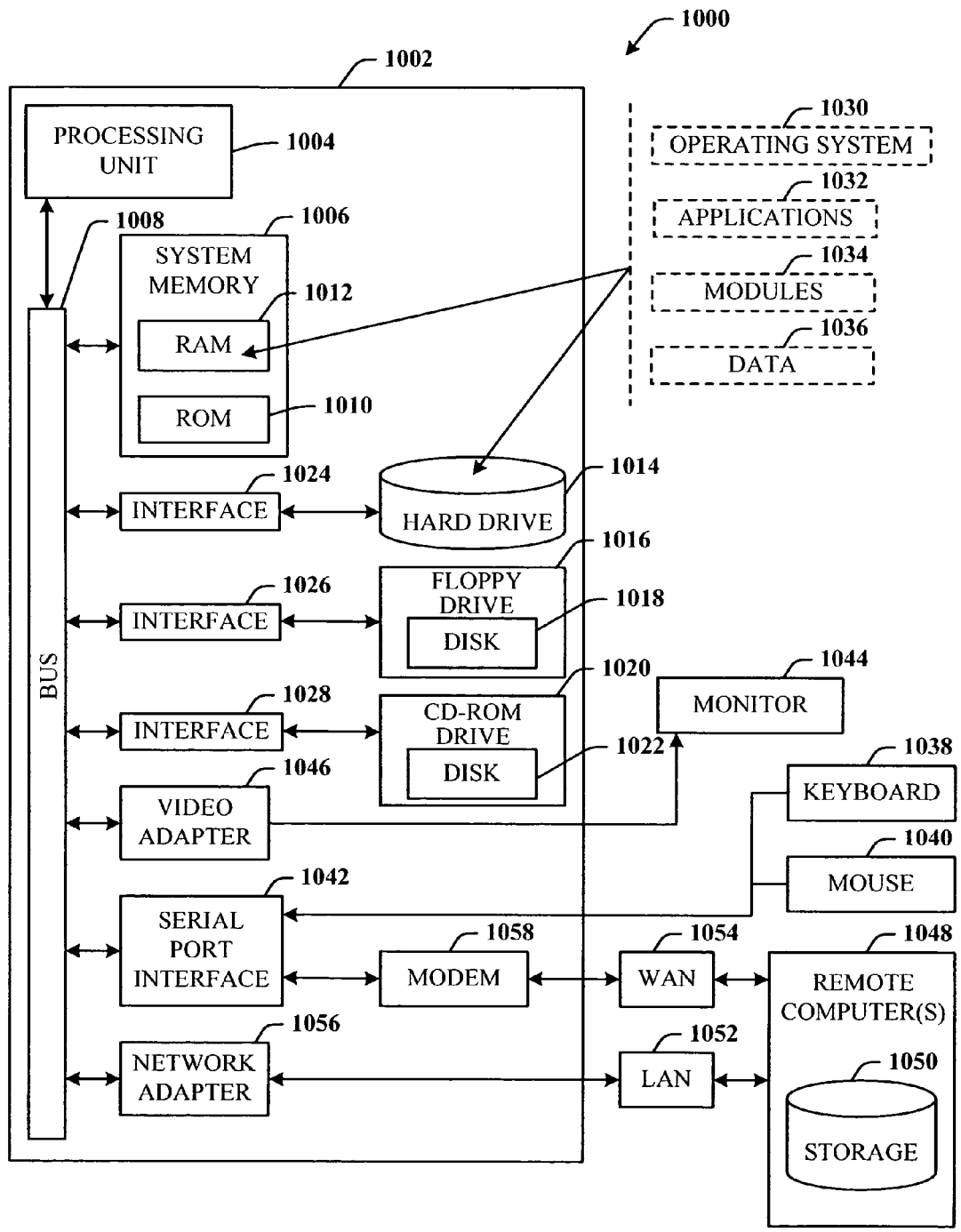
FIG. 10 illustrates a block diagram of a computer operable to execute the disclosed architecture.

Referring now to FIG. 10, there is illustrated a block diagram of a computer operable to execute the disclosed architecture. In order to provide additional context for various aspects of the present invention, FIG. 10 and the following discussion are intended to provide a brief, general description of a suitable computing environment 1000 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 10, there is illustrated an exemplary environment 1000 for implementing various aspects of the invention that includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 may be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes a hard disk drive 1014, a magnetic disk drive 1016, (e.g., to read from or write to a removable disk 1018) and an optical disk drive 1020, (e.g., reading a CD-ROM disk 1022 or to read from or write to other high capacity optical media such as Digital Video Disk (DVD)). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The drives and their associated computer-readable media provide nonvolatile storage of data, data structures, computer-executable instructions, and so forth. For the computer 1002, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012.

It is appreciated that the present invention can be implemented with various commercially available operating systems or combinations of operating systems.

A user can enter commands and information into the computer 1002 through a keyboard 1038 and a pointing device, such as a mouse 1040. Other input devices (not shown) may include a microphone, an IR remote control, a joystick, a game pad, a satellite dish, a scanner, or the like. These and other input devices are often connected to the processing unit 1004 through a serial port interface 1042 that is coupled to the system bus 1008, but may be connected by other interfaces, such as a parallel port, a game port, a universal serial bus ("USB"), an IR interface, etc. A monitor 1044 or other type of display device is also connected to the system bus 1008 via an interface, such as a video adapter 1046. In addition to the monitor 1044, a computer typically includes other peripheral output devices (not shown), such as speakers, printers etc.

The computer 1002 may operate in a networked environment using logical connections via wired and/or wireless communications to one or more remote computers, such as a remote computer(s) 1048. The remote computer(s) 1048 may be a workstation, a server computer, a router, a personal computer, portable computer, microprocessor-based entertainment appliance, a peer device or other common network node, and typically includes many or all of the elements described relative to the computer 1002, although, for purposes of brevity, only a memory storage device 1050 is illustrated. The logical connections depicted include a local area network (LAN) 1052 and a wide area network (WAN) 1054. Such networking environments are commonplace in offices, enterprise-wide computer networks, intranets and the Internet.

When used in a LAN networking environment, the computer 1002 is connected to the local network 1052 through a wired or wireless communication network interface or adapter 1056. The adaptor 1056 may facilitate wired or wireless communication to the LAN 1052, which may also include a wireless access point disposed thereon for communicating with the wireless adaptor 1056. When used in a WAN networking environment, the computer 1002 typically includes a modem 1058, or is connected to a communications server on the LAN, or has other means for establishing communications over the WAN 1054, such as the Internet. The modem 1058, which may be internal or external and a wired or wireless device, is connected to the system bus 1008 via the serial port interface 1042. In a networked environment, program modules depicted relative to the computer 1002, or portions thereof, may be stored in the remote memory storage device 1050. It will be appreciated that the network connections shown are exemplary and other means of establishing a communications link between the computers may be used.

The computer 1002 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.8 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 8 Mbps (802.11b) or 54 Mbps (802.11a) data rate or with products that contain both bands (dual band), so the networks can provide real-world performance similar to the basic 10BaseT wired Ethernet networks used in many offices.

The disclosed computer 1002 may also be employed with HiperLAN technology. HiperLAN is a set of wireless local area network (WLAN) communication standards primarily used in European countries. There are two specifications: HiperLAN/1 and HiperLAN/2, both of which have been adopted by the European Telecommunications Standards Institute. The HiperLAN standards provide features and capabilities similar to those of the IEEE 802.11 WLAN standards used in the U.S. and other adopting countries. HiperLAN/I provides communications at up to 20 Mbps in the 5-GHz range of the radio frequency spectrum. HiperLAN/2 operates at up to 54 Mbps in the same RF band, and is compatible with 3G (third-generation) WLAN systems for sending and receiving data, images, and voice communications. HiperLAN/2 has the potential, and is intended, for implementation worldwide in conjunction with similar systems in the 5-GHz RF band.

Figure 11:
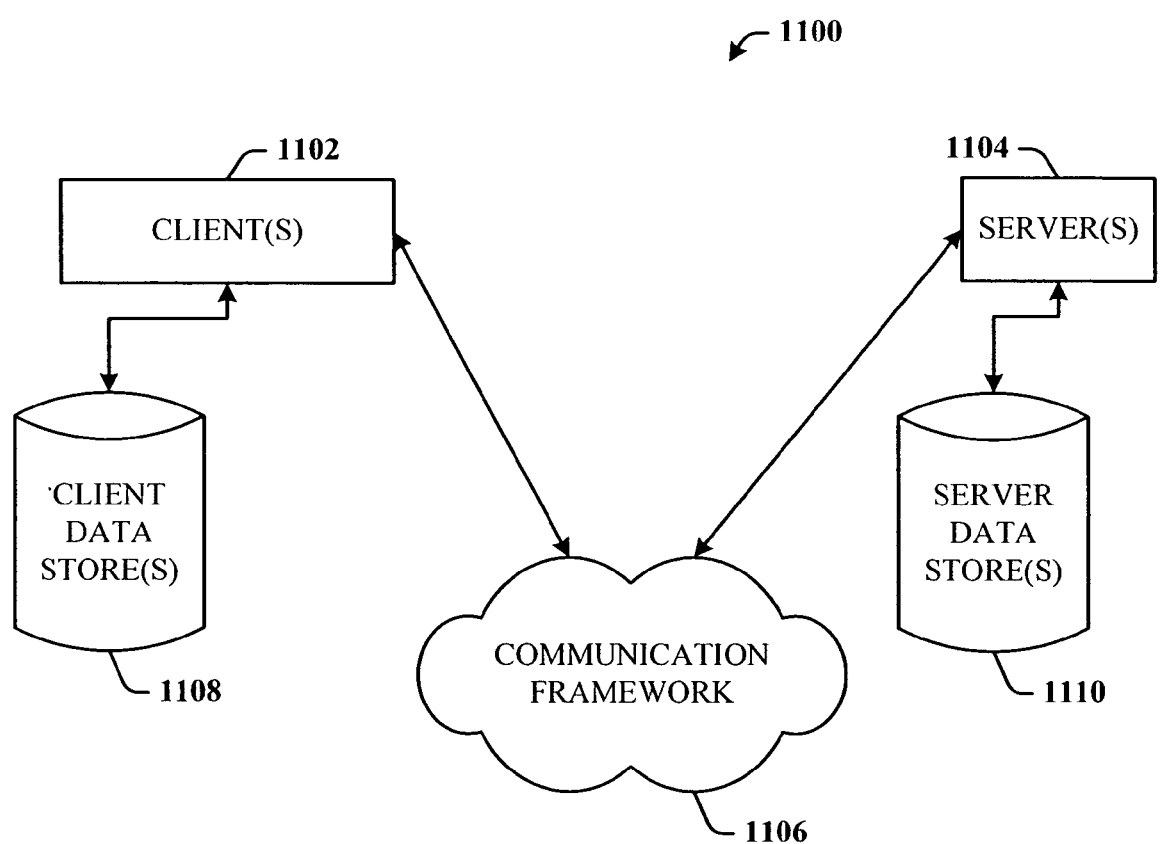
FIG. 11 illustrates a schematic block diagram of an exemplary computing environment in accordance with the present invention.

Referring now to FIG. 11, there is illustrated a schematic block diagram of an exemplary computing environment 1100 in accordance with the present invention. The system 1100 includes one or more client(s) 1102. The client(s) 1102 can be hardware and/or software (e.g., threads, processes, computing devices). The client(s) 1102 can house cookie(s) and/or associated contextual information by employing the present invention, for example. The system 1100 also includes one or more server(s) 1104. The server(s) 1104 can also be hardware and/or software (e.g., threads, processes, computing devices). The servers 1104 can house threads to perform transformations by employing the present invention, for example. One possible communication between a client 1102 and a server 1104 may be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications may be facilitated via a wired (including optical fiber) and/or wireless technology. The client(s) 1102 are operably connected to one or more client data store(s) 1108 that can be employed to store information local to the client(s) 1102 (e.g., cookie(s) and/or associated contextual information). Similarly, the server(s) 1104 are operably connected to one or more server data store(s) 1110 that can be employed to store information local to the servers 1104.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer readable medium having computer executable program code embodied thereon for performing the following act for authoring of rules:

composing a rule based on one or more statements, such that the rule is decomposed into a subset of instructions, the instructions are processed asynchronously to control utilization of computer resources and to facilitate at least one of testing assertions, enforcing constraints using runtime information, making inferences, performing correlation, or communicating results of dynamic tests to other components, the rule executed concurrently with one or more disparate rules in an infinite loop with suitable timeouts to keep the rule from running all the time, the rule associated with a rule type is defined by RDL (rules definition language) code while a separate XML document is employed to create instances of the rule type by specifying the parameter values necessary for its instantiation;

mapping a thread to at least one task for execution and employing the thread to execute multiple tasks concurrently;

providing primitives for automatically correlating asynchronous observations from a plurality of sources to eliminate the need to write multithreading code; and determining a model that is utilized for a given instance or implementation by employing an artificial intelligence scheme.

2. The computer readable medium of claim 1, at least one of the one or more statements facilitates activating the rule for processing.

3. The computer readable medium of claim 1, at least one of the one or more statements facilitates activating the rule according to least one of periodically or on detection of an event.

4. The computer readable medium of claim 1, the one or more statements facilitates performing a continuous polling loop.

5. The computer readable medium of claim 4, the polling loop is performed according to a polling interval such that the polling loop executes and then waits for the polling interval to expire before executing a next polling loop.

6. The computer readable medium of claim 4, the polling loop is facilitated according to a keyword that includes at least one of a variable, an object, or a constant.

7. The computer readable medium of claim 1, the rule executes concurrently with another rule.

8. The computer readable medium of claim 1, at least one of the one or more statements facilitates creating at least one of an implicit task or an explicit task, wherein the explicit task is created by explicitly specifying a keyword and an explicit task object, and the implicit task is created when a startup attribute is used on the rule.

9. The computer readable medium of claim 8, the statements facilitates explicit task declaration of the explicit task object for the explicit task, and use of a statement that launches concurrent execution of the rule.

10. The computer readable medium of claim 1, the one or more statements facilitates creating a task using one of a startup attribute or a signaling attribute.

11. The computer readable medium of claim 1, the one or more statements facilitates allowing the rule to invoke another rule.

12. The computer readable medium of claim 1, the one or more statements facilitates separating rule logic data from rule configuration data using at least one parameter.

13. The computer readable medium of claim 12, the at least one parameter is passed by one of a value or by reference.

14. The computer readable medium of claim 1, the rule is an independent rule authored using at least one of an infinite loop or an event-driven callback.

15. The computer readable medium of claim 14, the event-driven callback facilitates asynchronous delivery of a data item from a URI (uniform resource identifier)-based source.

16. The computer readable medium of claim 1, the rule is subscribed to reveal events at one time.

17. The computer readable medium of claim 1, the one or more statements facilitates collecting at least two data items concurrently, when the at least two data items become available.

18. The computer readable medium of claim 1, embodied within a device.

19. The computer readable medium of claim 1, the one or more statements facilitates at least one of automated rule instantiation based on XML (Extensible Markup Language), built-in polling without threading or concurrency considerations, and automated logging of rule instance information in alerts.

20. A computer readable medium having computer executable program code embodied thereon for providing a method that performs the act of authoring rules for concurrent processing, the method comprising:

composing a rule of one or more statements that facilitate decomposing the rule into a subset of instructions in accordance with the one or more statements, the instructions are processed at least one of asynchronously or out-of-order to improve utilization of computer resources, the rules processed to perform at least one of testing assertions, enforcing constraints using runtime information, making inferences, performing correlation, or communicating results of dynamic tests to other components, the rule associated with a rule type is defined by RDL (rules definition language) code the while a separate XML document is employed to create instances of the rule type by specifying the parameter values necessary for its instantiation;

mapping at least one thread to one or more tasks for execution and employing the at least one thread to execute several tasks concurrently;

providing primitives for automatically correlating asynchronous observations from a plurality of sources to eliminate the need to write multithreading code; and determining one or more models that are utilized for a given instance or implementation by employing an artificial intelligence scheme.

21. The method of claim 20, further comprising extension of the rule with constructs without modifying the rule, the extension is performed by one of, extending the rule to allow an alternate test before allowing the rule to fail;

constraining the rule to make the test more stringent; or hooking the rule.

22. The method of claim 20, further comprising forwarding a log event to a supervisor in accordance with the one or more statements of the rule.

23. The method of claim 20, further comprising forwarding a log event using a function in accordance with the one or more statements of the rule, the log event forwarded to a supervisor that deployed the rule from which the function is called.

24. The method of claim 20, further comprising forwarding an alert using a function in accordance with the one or more statements of the rule, the alert forwarded to a supervisor that deployed the rule from which the function is called.

25. The method of claim 20, further comprising, consolidating a plurality of events; and reporting a consolidated event summary based on the consolidated events according to a predetermined time interval.

26. The method of claim 20, further comprising monitoring system hardware and software resources in accordance with the one or more statements of the rule.

27. A computer readable medium having computer executable program code embodied thereon for providing a method of authoring rules for concurrent processing, the method comprising:

employing a rules definition language (RDL) to compose a rule of one or more statements that facilitate decomposing the rule into a subset of instructions that control utilization of computer resources by independent scheduling for out-of order execution, the logic of the rule representative of an infinite loop, the rules processed to perform at least one of testing assertions, enforcing constraints using runtime information, making inferences, performing correlation, or communicating results of dynamic tests to other components, the rule associated with a rule type is defined by RDL (rules definition language) code while a disparate XML document is employed to create instances of the rule type by specifying parameter values necessary for its instantiation;

mapping at least one thread to one or more tasks for execution;

employing the at least one thread to execute several tasks concurrently;

automatically correlating asynchronous observations from a plurality of sources by providing one or more primitives to eliminate the need to write multithreading code; and employing an artificial intelligence scheme to determine one or more models that are utilized for an instance or implementation.

\* \* \* \* \*